United States Patent
Retzlaff et al.

(10) Patent No.: US 10,460,544 B2
(45) Date of Patent: Oct. 29, 2019

(54) LOCKOUT/TAGOUT DEVICE WITH NON-VOLATILE MEMORY AND RELATED SYSTEM

(71) Applicant: BRADY WORLDWIDE, INC., Milwaukee, WI (US)

(72) Inventors: Gregory S. Retzlaff, Menomonee Falls, WI (US); Thomas Campbell, New Berlin, WI (US); Thaddeus C. Stankowski, Mequon, WI (US); Sohail Anwar, New Berlin, WI (US); Edward T. Cisek, Oconomowoc, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 131 days.

(21) Appl. No.: 15/323,214

(22) PCT Filed: Jul. 2, 2015

(86) PCT No.: PCT/US2015/038944
§ 371 (c)(1),
(2) Date: Dec. 30, 2016

(87) PCT Pub. No.: WO2016/004278
PCT Pub. Date: Jan. 7, 2016

(65) Prior Publication Data
US 2017/0140596 A1    May 18, 2017

Related U.S. Application Data

(60) Provisional application No. 62/020,794, filed on Jul. 3, 2014.

(51) Int. Cl.
*G07C 9/00*    (2006.01)
*G06K 19/07*    (2006.01)
(Continued)

(52) U.S. Cl.
CPC ............ *G07C 9/00896* (2013.01); *F16P 3/08* (2013.01); *G06K 19/0723* (2013.01); *G07C 1/32* (2013.01); *G07C 9/00309* (2013.01)

(58) Field of Classification Search
CPC .. G07C 9/00896; G07C 9/00309; G07C 1/32; G06K 19/0723; F16P 3/08
See application file for complete search history.

(56) References Cited

U.S. PATENT DOCUMENTS 6,994,258 B2    2/2006   Lewis
7,410,101 B2    8/2008   Lewis
(Continued)

FOREIGN PATENT DOCUMENTS

WO    2005118987 A1    12/2005

OTHER PUBLICATIONS

International Search Report and Written Opinion dated Sep. 30, 2015 for International Application No. PCT/US2015/038944.

*Primary Examiner* — Laura A Gudorf
(74) *Attorney, Agent, or Firm* — Quarles & Brady LLP

(57) ABSTRACT

A lockout/tagout or smart isolation device includes a wireless link, a non-volatile memory, and a controller in communication with the wireless link and the non-volatile memory. The wireless link is in selective communication with a wireless identification device, such as a keycard, carried by a user. The controller is programmed to receive a signal from the wireless link and write usage information about the device to at least a portion of the non-volatile memory such that the portion of the non-volatile memory storing the usage information cannot be erased or re-written thereby securely storing this usage information. This lockout/tagout or smart isolation device may be standalone or be part of a system that may potentially serve as part of a
(Continued)

facility-wide safety system (for example, networked or in communication with a SCADA system).

21 Claims, 17 Drawing Sheets

(51) Int. Cl.
*F16P 3/08* (2006.01)
*G07C 1/32* (2006.01)

(56) References Cited

U.S. PATENT DOCUMENTS

| | | |
|---|---|---|
| 8,384,548 B2 | 2/2013 | Knopf et al. |
| 8,751,504 B2 | 5/2014 | Michalscheck |
| 2003/0231102 A1 | 12/2003 | Fisher |
| 2009/0140856 A1 | 6/2009 | George et al. |
| 2010/0174915 A1* | 7/2010 | Prokin ................. G06Q 40/02 713/189 |
| 2010/0176919 A1 | 7/2010 | Myers et al. |
| 2011/0241838 A1 | 10/2011 | Wischmeyer |
| 2011/0254659 A1 | 10/2011 | Bowen et al. |
| 2012/0068817 A1* | 3/2012 | Fisher ................ G07C 9/00571 340/5.61 |
| 2012/0186308 A1 | 7/2012 | Garthe |
| 2012/0296448 A1 | 11/2012 | Balentine et al. |
| 2012/0313752 A1 | 12/2012 | Piccirillo et al. |
| 2012/0324968 A1* | 12/2012 | Goren ..................... E05B 41/00 70/280 |
| 2013/0214903 A1 | 8/2013 | Kalous et al. |
| 2014/0028443 A1 | 1/2014 | Ebner |
| 2014/0111303 A1 | 5/2014 | Scharnick |
| 2014/0176303 A1 | 6/2014 | Stratton et al. |

\* cited by examiner

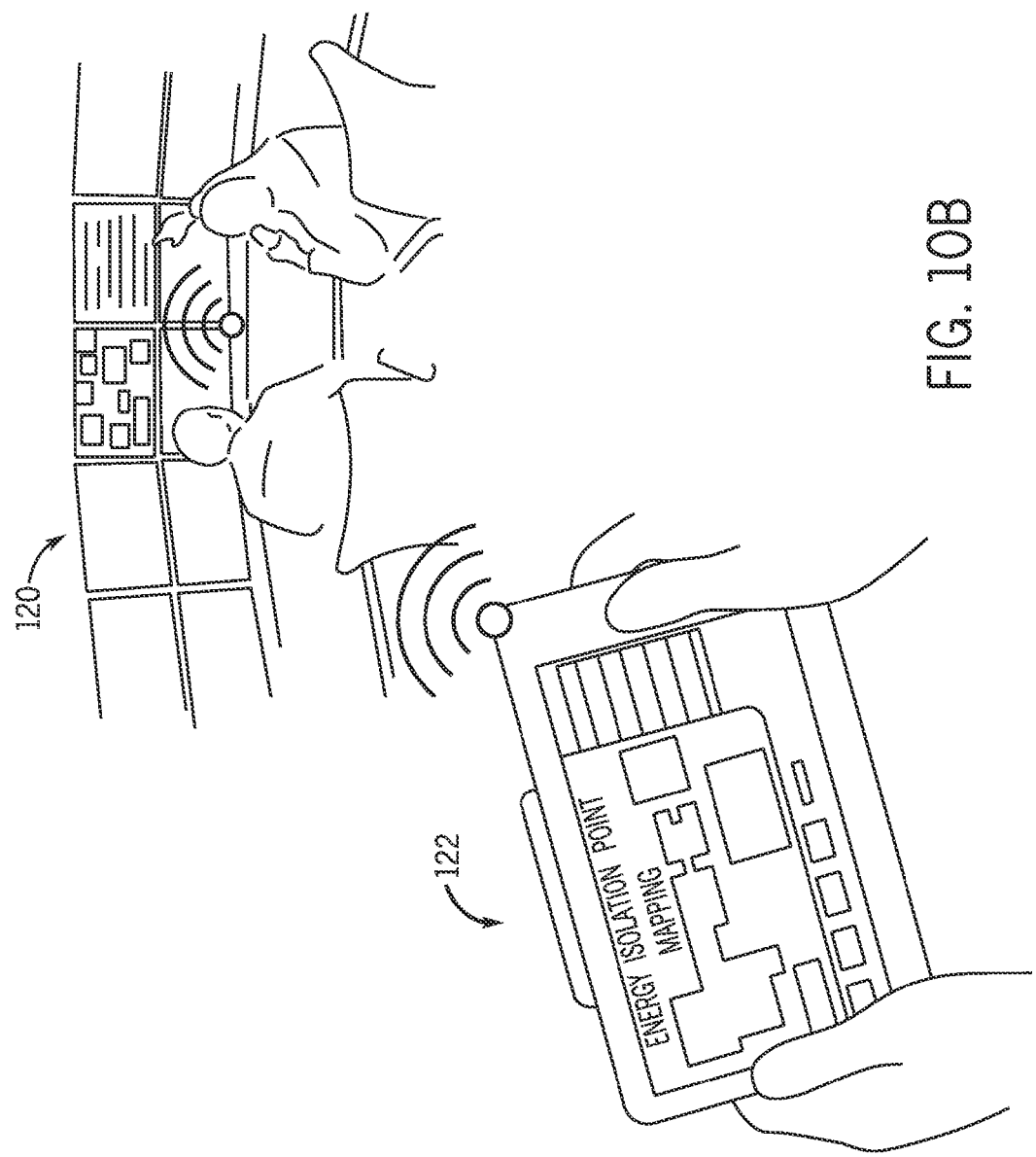

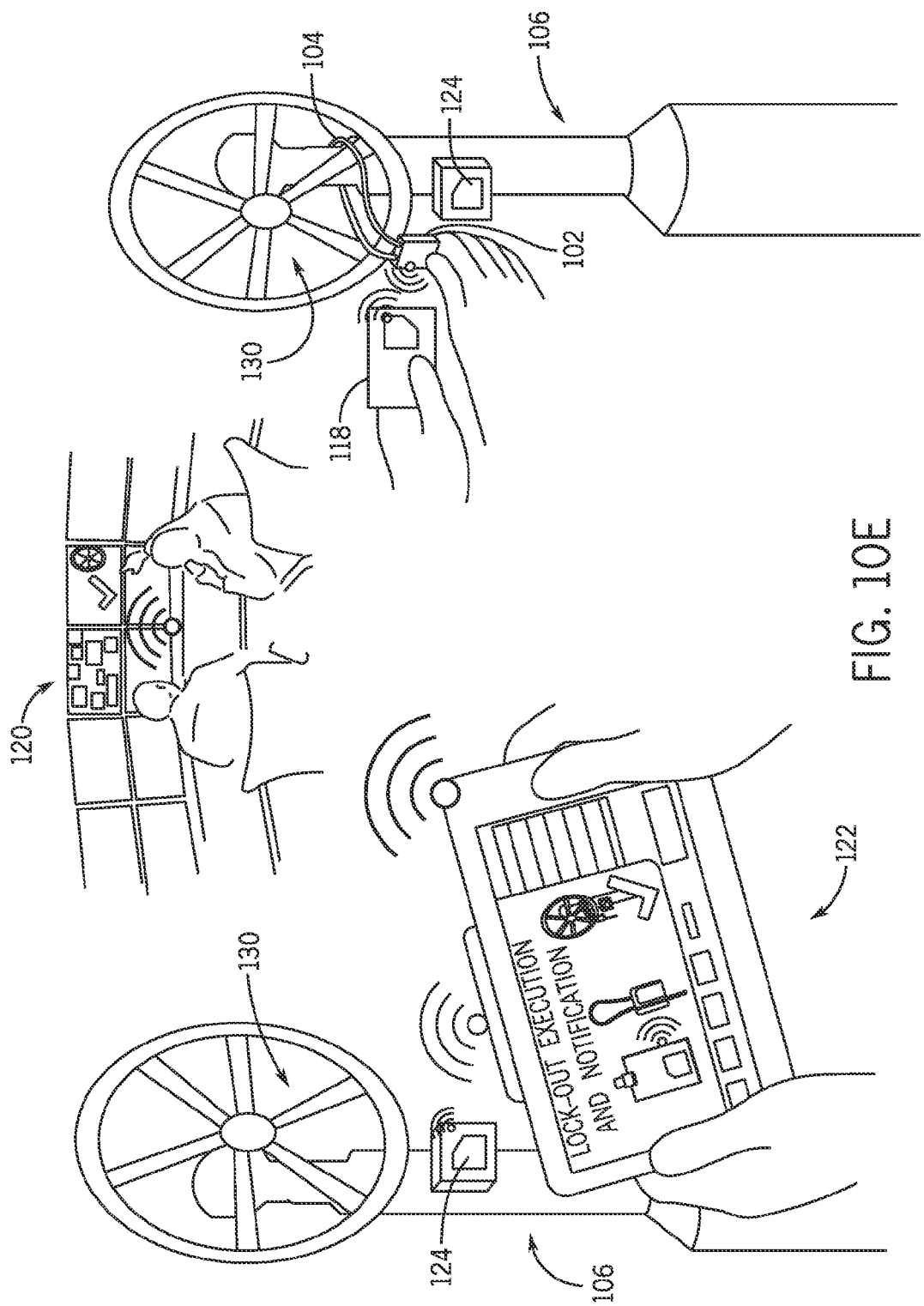

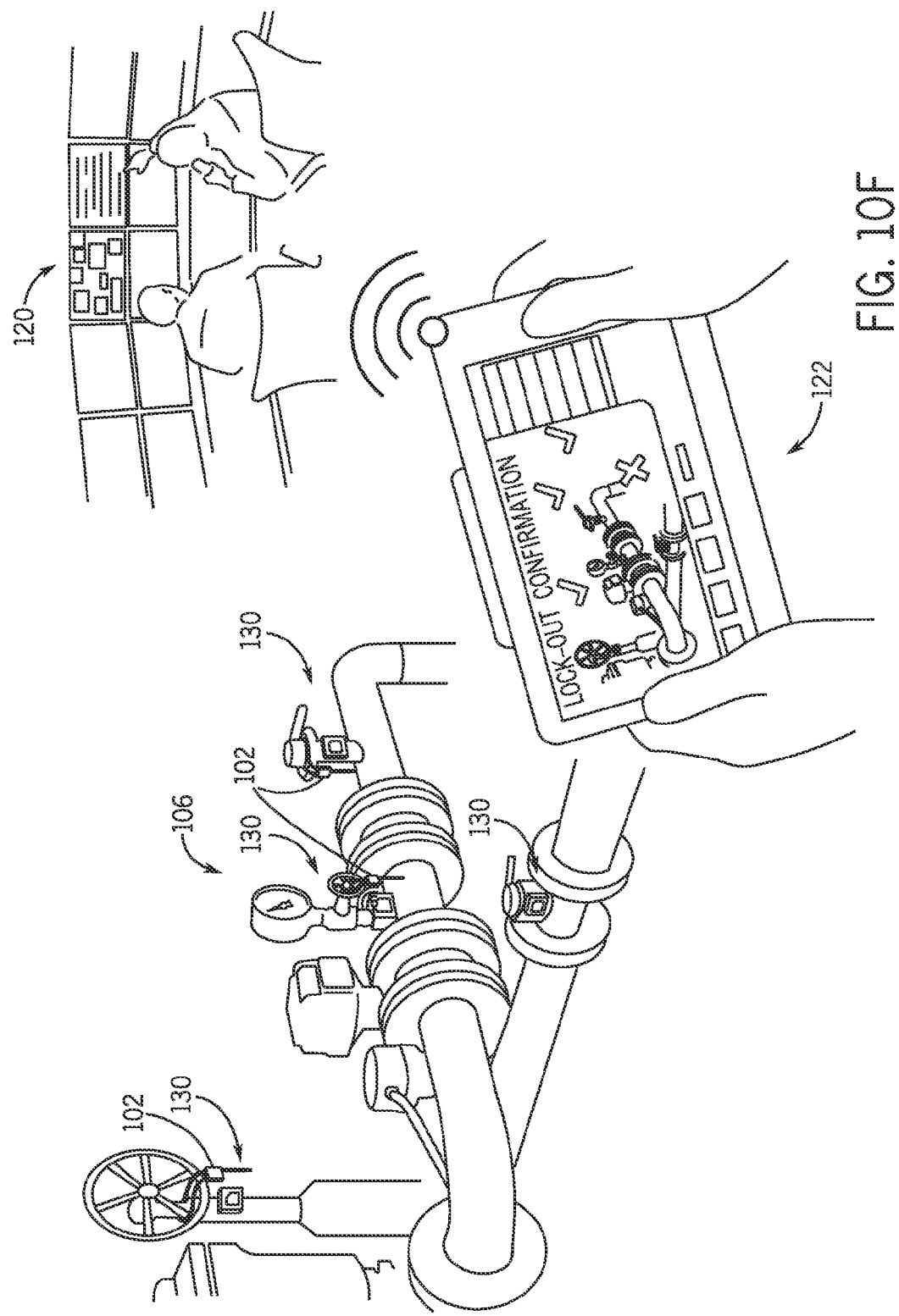

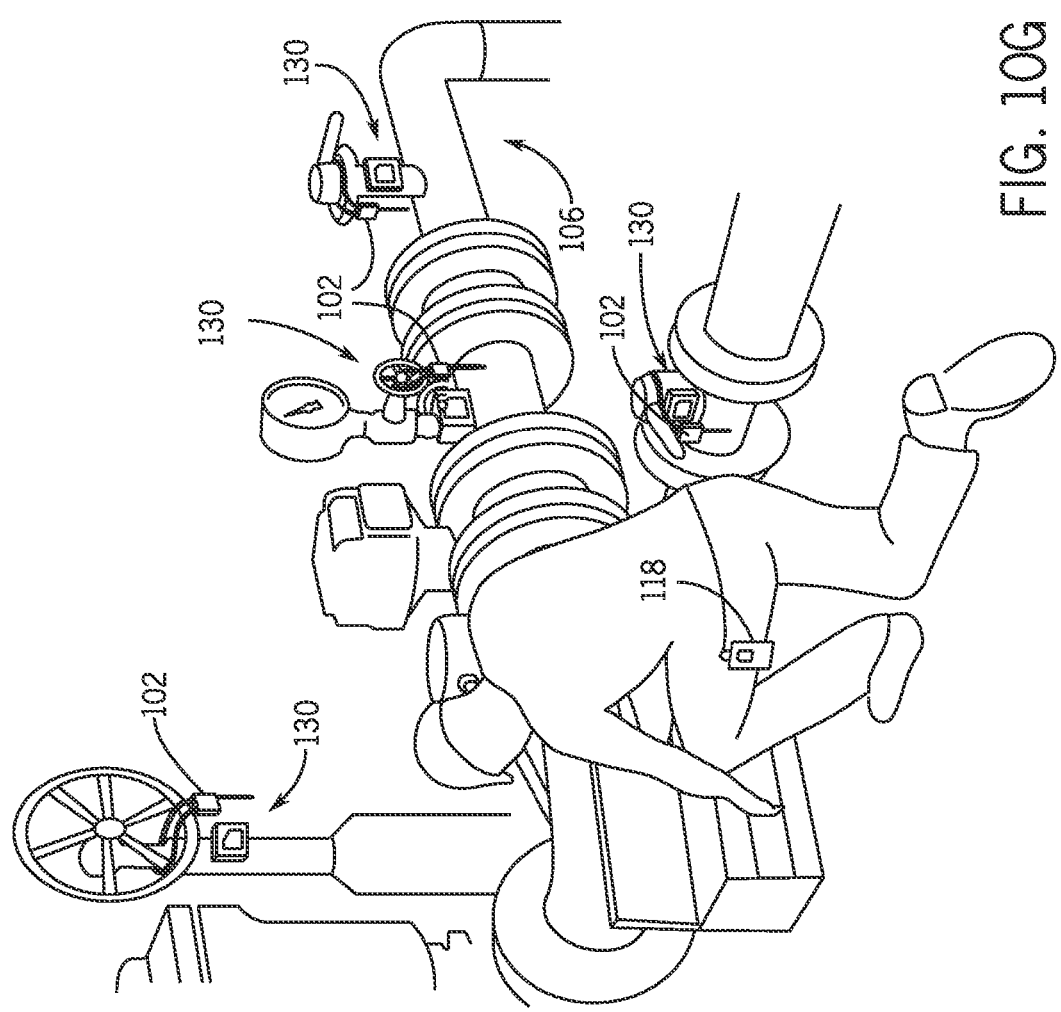

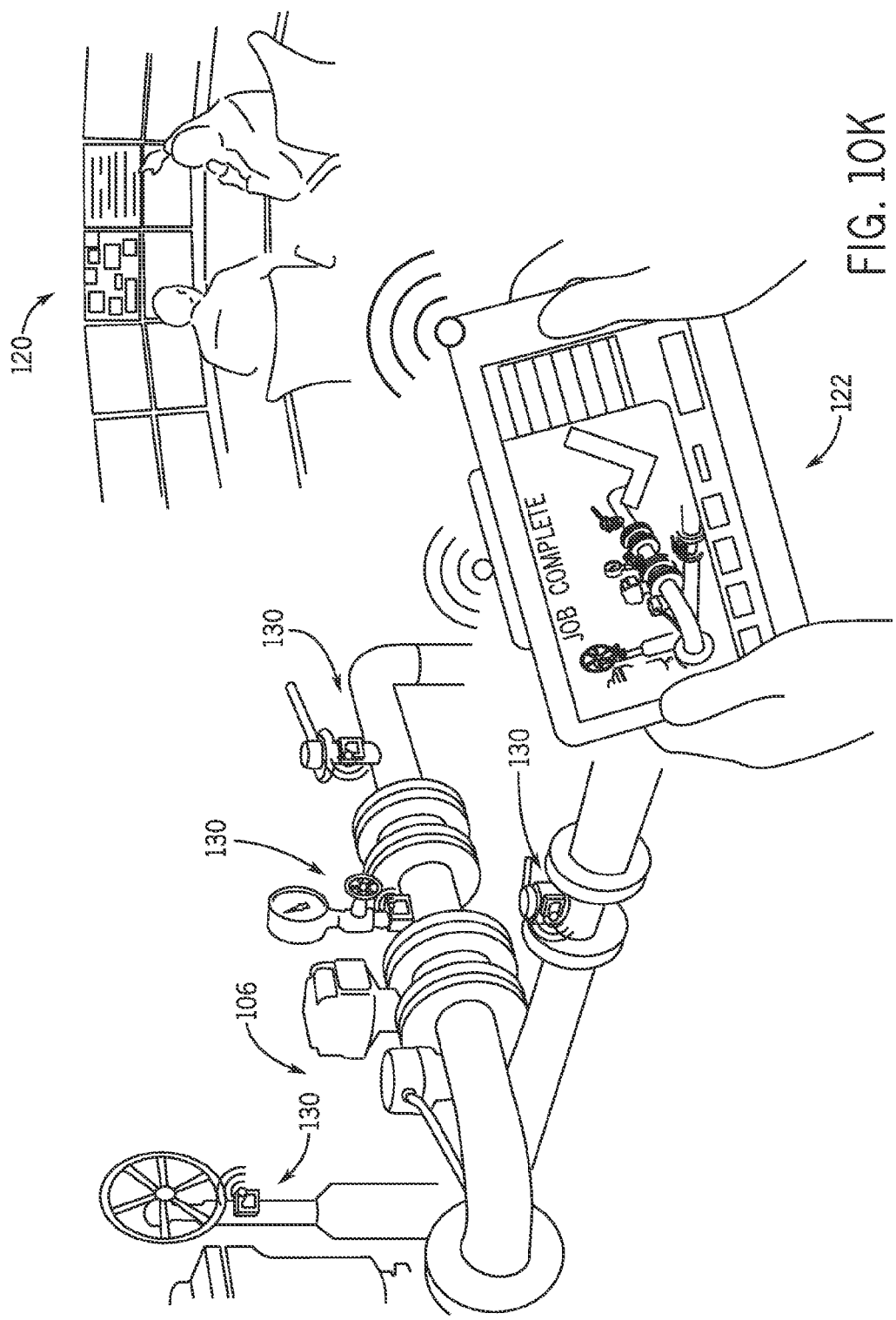

LOCKOUT/TAGOUT DEVICE WITH NON-VOLATILE MEMORY AND RELATED SYSTEM

CROSS-REFERENCE TO RELATED APPLICATIONS

This application represents the U.S. National Stage of International Application No. PCT/US2015/038944, filed Jul. 2, 2015 which claims the benefit of U.S. Provisional Application No. 62/020,794, filed Jul. 3, 2014, the contents of which are incorporated by reference herein for all purposes as if set forth in their entirety herein.

STATEMENT OF FEDERALLY SPONSORED RESEARCH OR DEVELOPMENT

Not applicable.

BACKGROUND

This disclosure relates to lockout/tagout devices and smart isolation devices for implementation in related systems. More specifically, this disclosure relates to lockout/tagout and smart isolation devices and systems having a secure record of the access history of the device.

Machines or equipment often contain energy sources that can be potentially hazardous to workers if these energy sources are not properly controlled and maintained. These energy sources may be, as some non-limiting examples, electrical, mechanical, hydraulic, pneumatic, chemical, and/or thermal in nature.

In order to protect workers from these energy sources while servicing or maintaining the machines or equipment, proper lockout/tagout procedures and practices may be voluntarily adopted or may be required by the Occupational Safety and Health Administration (OSHA). What constitutes appropriate lockout/tagout practices and procedures will largely depend on the specific equipment. Lockout/tagout procedures and practices involve following pre-determined steps or operations in order to disable the machinery or equipment to prevent the release of potentially hazardous energy before the equipment is maintained or to ensure that, when the equipment is placed back into service, workers remain protected from the potentially hazardous energy.

As one example of a lockout/tagout procedure, a service station box may be de-energized and unlocked by an authorized individual before a service technician maintains the electric equipment contained inside the box. After the service is completed, then the box may be re-energized and locked to ensure that unauthorized access to the equipment inside the box cannot occur.

As another example of a lockout/tagout procedure, when equipment is to be serviced, a valve or switch may be turned from an activated position to a deactivated position by an authorized user to turn off the potentially hazardous energy associated with the machine. The valve or switch may then be locked out in order to indicate that (a) the valve or switch should not be returned to the activated position or (b) to physically prevent the valve or switch from being returned to the activated position by a non-authorized user. Only upon completion of the service does the authorized user remove the lockout device and return the valve or control switch to the activated position such that the equipment can again be safely used.

SUMMARY

In most lockout/tagout systems, there exist devices and systems for controlling or restricting access to potentially hazardous energy. Indeed, some lockout devices, specifically safety lockout padlocks, are designed to only provide access to certain authorized users having keys to prevent unauthorized operation of the device.

However, even with such securing and authorization mechanisms in place, there is often not a reliable and secure way to confirm the individual that was the last authorized user to operate the lockout/tagout or isolation device. Although written or electronic logs or records may be kept as part of the lockout/tagout or isolation procedure, it is possible that these logs may not be accurately maintained by the users or even potentially tampered with by users to hide improper usage of the lockout/tagout or isolation procedure.

Disclosed herein are improved lockout/tagout and smart isolation devices and related systems incorporating these devices in which a non-volatile memory is used to maintain a secure access record of the lockout/tagout or smart isolation device and may be used in conjunction with reprogrammable memory. Because portions of the non-volatile memory may only be written to and read from to produce the secure access record (either by virtue of the physical structure of the memory itself or by virtue of the manner in which the controller is programmed to operate), the secure access record provides an accurate and true history of the usage of the lockout/tagout or smart isolation device. This secure access record can include the user(s) (or their credentials) that have used the lockout/tagout or smart isolation device and may further provide additional information including the time the device was used, the state of the device (for example, was the device opened or closed), the location of the lockout/tagout device (for example, the geographic location or location within a particular facility using a pre-defined locator tag, or even the specific energy isolation point to which the device is affixed), and potentially other relevant usage information. In instances in which proper lockout/tagout or isolation practices and procedures have not been followed, this secure access record can be trusted to explain who and under what circumstances the proper lockout/tagout or isolation procedure was or was not followed. Many companies establish a process wherein all executed work orders are retained for record-keeping purposes. In view of such improper action, the individual identified by the record might be identified and reprimanded and/or held responsible for their failure to follow proper the lockout/tagout or isolation procedures.

Furthermore, disclosed herein are lockout/tagout devices and systems that avoid the use of mechanical cylinder and key to accomplish locking, plus assure that unique and secure operating credentials can be assigned to operate the lock and accomplish the desired lockout state.

According to one aspect of the invention, a lockout/tagout device includes a wireless link, a non-volatile memory, and a controller. The wireless link is for selective communication with a wireless identification device (for example, a keycard) carried by a user. The non-volatile memory is for storing usage information about the lockout/tagout device. The controller is in communication with the wireless link and the non-volatile memory and is programmed to receive a signal from the wireless link and write the usage information about the lockout/tagout device to the non-volatile memory such that the portion of the non-volatile memory storing the usage information cannot be erased or re-written.

It is contemplated that the portion of the non-volatile memory containing the usage information may be prevent from erasure or being re-written in more than one way. In some forms, the portion of the memory used to store the usage information may be selected to be physically capable of being written to, but not capable of being readily erased or re-written. In these forms, the non-volatile memory may be, for example, a field programmable read only memory (FPROM), a one-time programmable memory (OTP), a programmable read only memory (PROM) [which are all alternative ways of describing the same type of memory] which physically prevent an erasure or re-writing of the portion of the non-volatile memory storing the usage information. Such types of memory can be written to in multiple separate and discrete instances to add to the usage information or log, but once particular bits are written, those individual bits cannot be further altered or revised. If the non-volatile memory is one-time programmable memory, the memory may be writable and readable, but may not be readily re-writable or erased. In this way, the usage information provides a secure access record for the device and the usage information provides a tamper-proof history of the device. It should be appreciated that certain types of OTP memories such as Erasable Programmable Read-Only Memory (EPROM) may be entirely erasable under extreme conditions (i.e., exposure to strong ultraviolet light), but that for all practical purposes, the memory is not readily re-writable at the bit or byte resolution. Preferably, the OTP memory is non-volatile so that power may not need to be continuously supplied to retain the usage information in the memory. Power may need to be continually supplied, or query from time or time, to the OTP memory at least while lockout events are in process.

Alternatively, in other forms, to prevent erasure or re-writing of the portion of the non-volatile memory containing the usage information, the controller may be programmed to prevent the portion of the non-volatile memory storing the usage information from being erased and re-written, even if the non-volatile memory itself is physically capable of being erased or re-written. Accordingly, rather than potentially investing in special memory, the controller can be programmed to achieve a similar effect with other types of non-volatile memory.

In some forms, it is contemplated that the wireless link, the non-volatile memory, and the controller may be supported by a body of the lockout/tagout device. Indeed, in some forms, they may be entirely contained within the body or housing of the lockout/tagout device. However, it is contemplated that in some forms, the components may be separate from the body of the lockout/tagout device. As one example, the non-volatile memory might be separate from the body and the usage information may be wirelessly communicated to a second body that houses the one-time programmable memory by the wireless link of the lockout/tagout device. In this way, secure usage information log can be stored remotely from the locking portion of the device itself and in a location that is either centrally located relative to multiple devices or secured in other ways. Still yet, when a field programmable read only memory is employed, a single memory unit might wireless receive usage information from each of the devices and be singularly used to store usage information for multiple devices such that separate FPROMs are not required in each device. Such off-device storage may also help to further secure the history of the lockout/tagout device, because removing and destroying the physical body of the device would not be able to destroy usage information log which is stored remotely on in the non-volatile memory (which could be separately secured under lock and key and/or periodically backed up to further secure the usage information stored on the memory).

The body may further support a user-operated control that is in communication with the controller. If a user-operated control is present, then the controller may be further programmed such that, upon operation of the user-operated control, the controller temporarily activates the wireless link for communication with the wireless identification device. As one non-limiting example, the user-operated control may be a button accessible from the outside of the lockout/tagout device that, when pressed, is used to temporarily activate an RFID tag reader or RF transponder in the lockout/tagout device. The controller may be further programmed to deactivate the wireless link a pre-determined amount of time after the operation of the user-operated control such that the wireless link is not communicable with the wireless identification device. By only selectively activating the wireless link, the lockout/tagout device can be made to operate for long periods of time while consuming only a minimal amount of power, thereby preserving internal battery life.

In some forms, the lockout/tagout device may have a lockable body with a locking member that alternatively has an opened state and a closed state relative to the locking body. In the opened state, the locking member may not form a closed and secured loop with the body, permitting the attachment of the lockout/tagout device onto equipment at an energy isolation point. However, in the closed state of the lockable body, a closed loop may be formed between the lockable body and the locking member such that the lockout/tagout device can be securely stored during a non-use condition or securely attached to the equipment at an energy isolation point and not readily removed by a non-authorized user. In some forms of the invention, the locking member may only be transitioned or switched between opened and closed states after an authorized wireless identification device has been detected by the wireless link of the lockout/tagout device. In this sense, upon presentation of the wireless identification device, the controller may cause actuation of an element (for example, an engagement member holding or releasing the locking member) to permit opening/unlocking or closing/locking of the locking member. Thus, the wireless identification device (particularly in near field communication circumstances) can effectively serve as an action-instructing mechanism for the lockout/tagout device. Put another way, the controller may be further configured to alter the lockout/tagout device between a locked state and an unlocked state upon a detection of the wireless identification device by the wireless link.

The usage information written to the non-volatile memory may include unique identifying information about the wireless identification device of a user that is operating the lockout/tagout device. Additional usage information may further include information about the time of usage of the lockout/tagout device, the spatial location of the lockout/tagout device, and other relevant usage information.

In some forms of the invention, the wireless identification device may be one of a plurality of unique wireless identification devices in which each of the plurality of unique wireless identification devices are communicable with the wireless link. These wireless identification device(s) may be used separately to operate the lockout/tagout device and/or may be used together as part of a group lockout procedure (wherein multiple employee credentials are programmed and some or all of these are required to change the open/locked state of the lockout/tagout device.

The wireless link may take a number of forms. In one form, the wireless link may include an RF transponder in the lockout/tagout device. However, other forms of the wireless link may incorporate Bluetooth® (including Bluetooth® Low Energy or Bluetooth® LE), near field communication (NFC), 802.11 WIFI protocols (or "WIFI" that is based on the Institute of Electrical and Electronics Engineers' 802.11 standards), and so forth as well as combinations of various protocols. To the extent that the wireless link is being used to detect the presence of a user within a certain proximity of the lockout/tagout device, it may be desirable to select a protocol that has limited range to avoid the unintentional detection of a wireless identification device by an authorized user in the range of the device but who is not actually operating the device.

According to another aspect of the invention, a lockout/tagout system is provided including the lockout/tagout device including some or any combination of the features described above and a wireless identification device for selective communication with the wireless link of the lockout/tagout device.

Again, the wireless link may include an RF transponder in the lockout/tagout device and an RFID tag may be found in the wireless identification device that can be read by the RFID transponder or reader. As noted above, other wireless protocols may also be used instead of RFID.

It is contemplated that, in some forms, the wireless identification device may be a key card or other credentials or may be embedded in a separate maintenance tool for use with an item of equipment on which the lockout/tagout device is used. In other forms, the wireless identification device might be part of a wireless/mobile device (such as a smart phone, tablet or computer).

The lockout/tagout system may also include a locator tag supported by the equipment at an energy isolation point. The controller may be programmed to read the locator tag upon use of the lockout/tagout device to write location information into the usage information. In other forms, it is contemplated that location information might be provided without a locator tag. For example, the lockout/tagout device may include a global positioning system (GPS) receiver that provides geographic coordinates. A GPS receiver may be of more practical use if the lockout/tagout device is being used at an outdoor/remote location where such geographic resolution would be acceptable; locator tags may be more appropriate for indoor industrial applications.

Still yet, according to other aspects, a smart isolation device is disclosed in which the device itself includes the features described herein with respect to the lockout/tag out device. The smart isolation device includes a wireless link for selective communication with a wireless identification device carried by a user, a non-volatile memory for storing usage information about the smart isolation device, and a controller in communication with the wireless link and the non-volatile memory. The controller is programmed to receive a signal from the wireless link and write the usage information about the smart isolation device to at least a portion of the non-volatile memory such that the portion of the non-volatile memory storing the usage information cannot be erased or re-written.

Again, in some forms, the smart isolation device may have non-volatile memory which is a field programmable read only memory (FPROM), a one-time programmable memory (OTP), or a programmable read only memory (PROM) physically that prevents an erasure or re-writing of the portion of the non-volatile memory storing the usage information. It is contemplated that in some forms, a similar effect may be achieved by programming the controller to prevent the portion of the non-volatile memory storing the usage information from being erased and re-written, even if the non-volatile memory itself is physically capable of being erased or re-written.

In some forms, the wireless link, the non-volatile memory, and the controller may be supported by a body of the smart isolation device. A user-operated control may be supported by the body and this control may be in communication with the controller. The controller may be further programmed such that, upon operation of the user-operated control, the controller temporarily activates the wireless link for communication with the wireless identification device. The controller may be further programmed to deactivate the wireless link a pre-determined amount of time after the operation of the user-operated control such that the wireless link is deactivated and not communicable with the wireless identification device.

The usage information written to the non-volatile memory may include unique identifying information about the wireless identification device. The usage information written to the non-volatile memory may further include information about at least one of the time of usage of the smart isolation device and the spatial location of the smart isolation device that are written in conjunction with the unique identifying information about the wireless identification device.

In some forms, the wireless identification device may be one of a plurality of unique wireless identification devices in which each of the plurality of unique wireless identification devices are communicable with the wireless link.

In some forms, the wireless link may include an RF transponder in the smart isolation device for reading an RFID tag in the wireless identification device.

The usage information written to the non-volatile memory may provide a tamper-proof history of the smart isolation device.

In some forms, the controller may be further configured to alter the smart isolation device between a locked state and an unlocked state upon a detection of the wireless identification device by the wireless link. In these forms, the wireless identification device can serve as an action-initiating set of credentials that perform one or more actions upon presentation before the device.

Again, the wireless link for selective communication with a wireless identification device operates may use a communication protocol selected from the group consisting of near field communication (NFC), WIFI implementing 802.11 standards (WIFI), Bluetooth, Bluetooth Low Energy (Bluetooth LE), and radio frequency identification (RFID). However, the protocols are not limited to this exemplary list.

According to another aspect, a smart isolation system is disclosed. The smart isolation system includes the smart isolation device described above and further includes a wireless identification device for selective communication with the wireless link of the smart isolation device.

As noted above, it is contemplated that the wireless link may include an RF transponder in the smart isolation device and the wireless identification device may include a corresponding RFID tag.

In some forms, the wireless identification device may be embedded in a separate maintenance tool or smart device for use with an item of equipment on which the smart isolation device is placed.

In some forms, the system may further include a locator tag securely and non-movable received on equipment for smart isolation at an energy isolation point on the equipment and the controller of the smart isolation device may be programmed to read the locator tag upon use of the smart isolation device to write location information into the usage information.

In some forms, the system may include a central network for communication with other network elements and a display on other network elements.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 10A through 10K illustrates sequentially how the lockout/tagout system can be implemented including the steps of permitting the wireless identification device (credentials), locator tag, and the lockout/tagout device (smart lock) to work together; mapping the facility in which the system will be used; performing the lockout/tagout procedure at an energy isolation point; confirming completion of the lockout/tagout procedure; operating on the locked out equipment with the isolation points having been secured; removing the lockout/tagout device as part of a start-up procedure; and confirming the job as complete.

DETAILED DESCRIPTION

Figure 1:
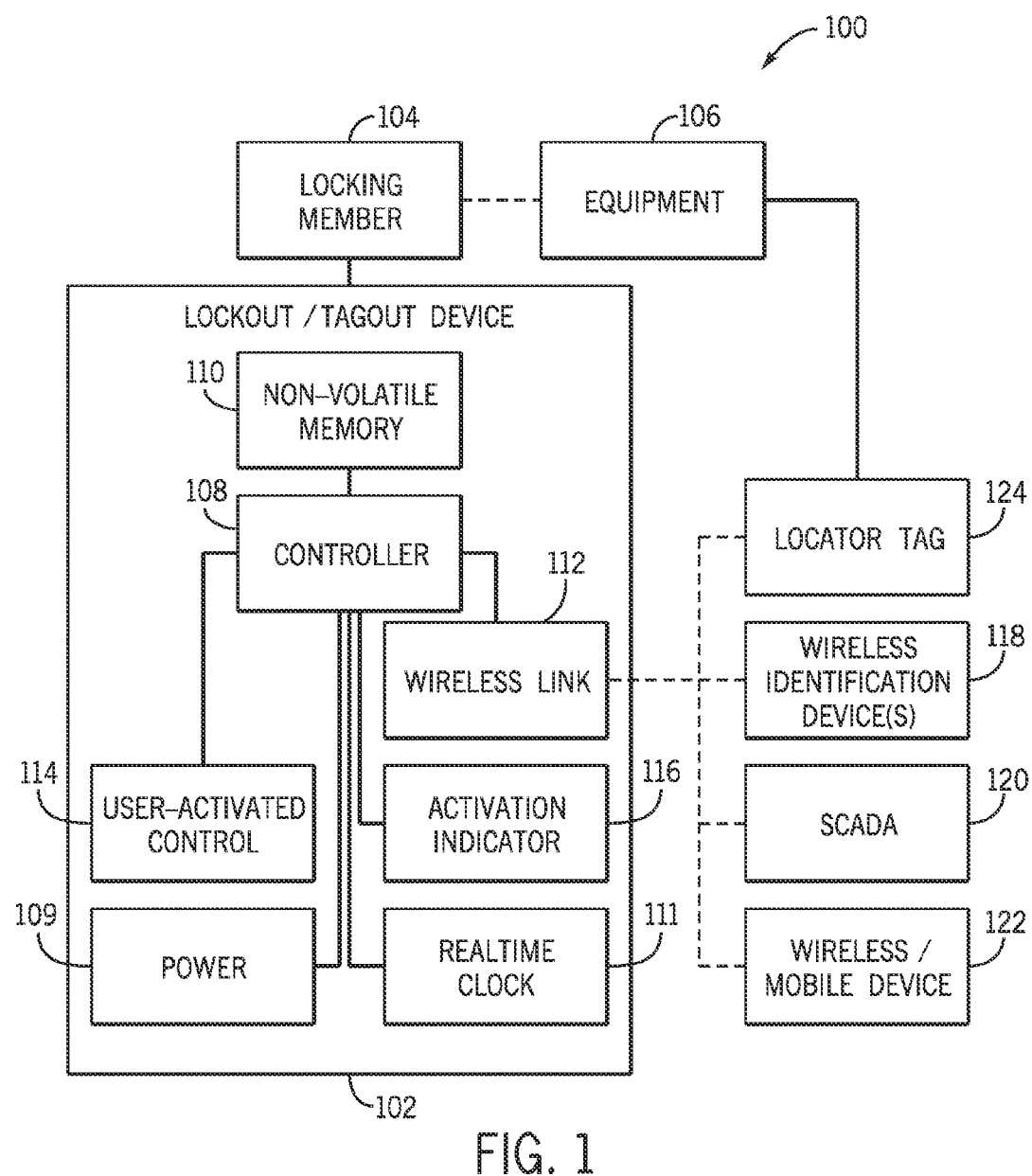
FIG. 1 is a schematic representation of a lockout/tagout device and related system.

Referring first to FIG. 1, a schematic of a lockout/tagout system 100 is illustrated. The lockout/tagout system 100 includes a lockout/tagout device 102 that is selectively attachable via a locking member 104 to equipment 106 at an energy isolation point such as a switch, valve, and so forth during a lockout/tagout procedure. As can be seen in FIG. 1, the lockout/tagout device 102 includes a controller 108 that is in communication with a power supply 109, a non-volatile memory 110, a realtime clock 111, a wireless link 112, a user activated control 114, and an activation indicator 116. The power source 109 may be, for example, an internal battery to power the various components. The real time clock 111 may be used to provide date and time information. The wireless link 112 can be placed in selective communication with one or more of various objects as will be described in greater detail below including one or more wireless identification devices 118 (such as, for example, a keycard or other credentialing item), a supervisory control and data acquisition (SCADA) system 120, a wireless/mobile device 122 (such as, for example, a phone, tablet, or computer), and locator tags 124 that may be attached to the equipment 106 in the proximity of one or more energy isolation points.

Various physical manifestations of the lockout/tagout device 102 are contemplated and will be described in greater detail below. As some non-limiting examples, the lockout/tagout device 102 may be a padlock, a cable lock, and so forth. It is contemplated that the locking member 104 of the lockout/tagout device 102 may be of a quality that the lockout/tagout member 104 can be strongly mechanically attached to the equipment 106 to provide a mechanical blocking function of a control on the equipment 106 at an energy isolation point in order to prevent the usage of the control; however, for purposes of providing a visual lockout/tagout, it may be sufficient that the locking member 106 simply engages the equipment 106 in a way that make clear the lockout/tagout has been made. The locking member 104 may be, for example, a shackle or a cable that is able to form an opened or closed loop with the body of the lockout/tagout device 102; however, other types of locking members may be used depending upon the specific locking configurations.

It will be appreciated that the controller 108 is programmed to provide the functionality described herein. Thus, one having ordinary skill in the art will appreciate that, in the disclosure that follows, any description of a particular recited functionality (e.g., action and/or response) can be achieved by programming the controller 108, given that the controller 108 is in communication with the various component parts of the lockout/tagout device 102. Thus, any description of recited functionality should be taken to mean that the controller 108 is programmed to operate in the way recited to achieve the recited result.

The non-volatile memory 110 is used to store a secure access record of usage information from the lockout/tagout device 102. Preferably the memory 110 is non-volatile so that power is not required when the lockout/tagout device 102 is in a non-active state.

The non-volatile memory 110 should be a memory that can be written to and read from, but not readily re-written without clearly indicating that the memory has been deleted, purged, or otherwise modified. It is contemplated that these type of read and write permissions may either be achieved by programming the controller in such a manner that portions or bits of the non-volatile memory 110 can be written to once and only ready thereafter or by selecting a physical type of non-volatile memory 110 that can only have bits written once and not further modified after that write operation due to the physical qualities of the memory itself (that is, once written, individual bits may be read but not re-written).

In some embodiments, the portion of the memory 110 used to store the usage information may be selected to be physically capable of being written to, but not capable of being readily erased or re-written. In these forms, non-volatile memory 110 may be, for example, a field programmable read only memory (FPROM), a one-time programmable memory (OTP), or a programmable read only memory (PROM) [which are all alternative ways of describing the same type of memory] which physically prevent an erasure or re-writing of the portion of the non-volatile memory storing the usage information. Such types of memory can be written to in multiple separate and discrete instances to add to the usage information or log, but once particular bits are written, those individual bits cannot be further altered or revised. If the non-volatile memory 110 is one-time programmable memory, the one-time programmable memory may be writable and readable, but may not be readily re-writable or erased. In this way, the usage information provides a secure access record for the lockout/tagout device 102 and the usage information contained in this secure access record provides a tamper-proof history of the lockout/tagout device 102. It should be appreciated that certain types of one-time programmable memories such as Erasable Programmable Read-Only Memory (EPROM) may be entirely erasable under extreme conditions (i.e., exposure to strong ultraviolet light), but that for all practical purposes, the memory is not readily re-writable at the bit or byte resolution.

In other embodiments, to prevent erasure or re-writing of the portion of the non-volatile memory 110 containing the usage information, the controller 108 may be programmed to prevent the portion of the non-volatile memory 110 storing the usage information from being erased and re-written, even if the non-volatile memory 110 itself is physically capable of being erased or re-written. Accordingly, rather than potentially investing in special memory, the controller 108 can be programmed to achieve a similar effect with other types of non-volatile memory. It will be appreciated that this control at the controller level might be done for example by partitioning the memory 110 into portions including a portion that the controller 108 can additively write once to and not re-writen or erased the specific bits once written (for storage of the usage information) and another portion that can be written and re-written without such restrictions.

In addition to the non-volatile memory 110, illustrated the lockout/tagout device 102 may additionally include a separate reprogrammable memory that is in communication with the controller. This memory may be any one of a number of types of standard re-writeable memory (for example, flash memory). Accordingly, there may be multiple types of memory in this single device, not all of which are of the same type.

The wireless link 112 is used to selectively communicate with one or more other wireless devices via wireless protocols such as radio-frequency identification (RFID), Bluetooth®, Bluetooth® LE (Low Energy), near field communication (NFC), 802.11 WIFI (WIFI), and so forth. There may be one or more such wireless links or protocols involved in the lockout/tagout device 102. Some of these protocols may involve long distance wireless communication; however, in the instances in which one or more of the wireless items in communication with the wireless link 112 are used to serve as a key for operation of the lockout/tagout device 102, it may be preferable for those protocols to be of limited range (for example, less than 10 feet or even closer) for security purposes.

The user-activated control 114 is a control supported by a body of the lockout/tagout device 102 that can be operated in order to activate the wireless link 112 for a pre-determined duration of time. The user-activated control 114 may be, for example, a button or switch. As one example, when the user-activated control 114 is operated, the wireless link 112 is activated for communication with the various wireless elements and, further, the activation indicator 116 (which may be, for example, a light emitting diode or display) indicates that the wireless link 112 has been activated by, for example, illuminating. After some duration of time has passed (for example, 30 seconds) the wireless link 112 is deactivated to save energy. However, it is also contemplated that the wireless link 112 may also always be on and a user activated control 114 may be absent.

The wireless identification device 118 may be a unique item such as a keycard or other credentialing device that communicates with the wireless link 112 to restrict access to and control of the lockout/tagout device 102. Effectively, this wireless identification device 118 serves a similar function to a mechanical key in that it permits an authorized user to lock or unlock the lockout/tagout device 102 when the wireless identification device 118 is presented to the wireless link 112. The lockout/tagout device 102 may be programmed such that, only upon the presentation of an authorized wireless identification device 118 to the wireless link 112 can the lockout/tagout device 102 be locked or unlocked. Alternatively, the lockout/tagout device 102 may be locked/unlocked upon the presentation of one of multiple possible authorized wireless identification devices. As yet another alternative, upon the presentation of a group or subset of multiple authorized wireless identification devices the lockout/tagout device 102 may be locked or unlocked. However, the presentation of unauthorized wireless identification devices (or less than the full group or subset of authorized wireless identification devices depending on the manner of programming of the lockout/tagout device 102) will not result in the lockout/tagout device 102 being locked or unlocked. In some forms, the presentation of the wireless identification device 118 to an activated wireless link 112 may itself result in the locking or unlocking action; however, in other forms, presentation of the wireless identification device 118 to an activated wireless link 112 may further require the user to manually move or actuate portions of the lockout/tagout device 102 to open or close the locking member 104.

It will be appreciated that, in some forms, the locking member 104 of the lockout/tagout device 102 may be closed, but may not actually be locked, relative to a body of the lockout/tagout device 102. In many constructions, the opened or closed state is not the same as an unlocked or locked state, respectively of the lockout/tagout device 102. In some constructions of the lockout/tagout device 102 even when the locking member 104 is closed, the user(s) may still need to present his or her credentials (by way of presentation of the wireless identification device or devices) in order to actually effectuate the locking mechanism to place the lockout/tagout device 102 in the locked state.

Figures 2A, 2B:
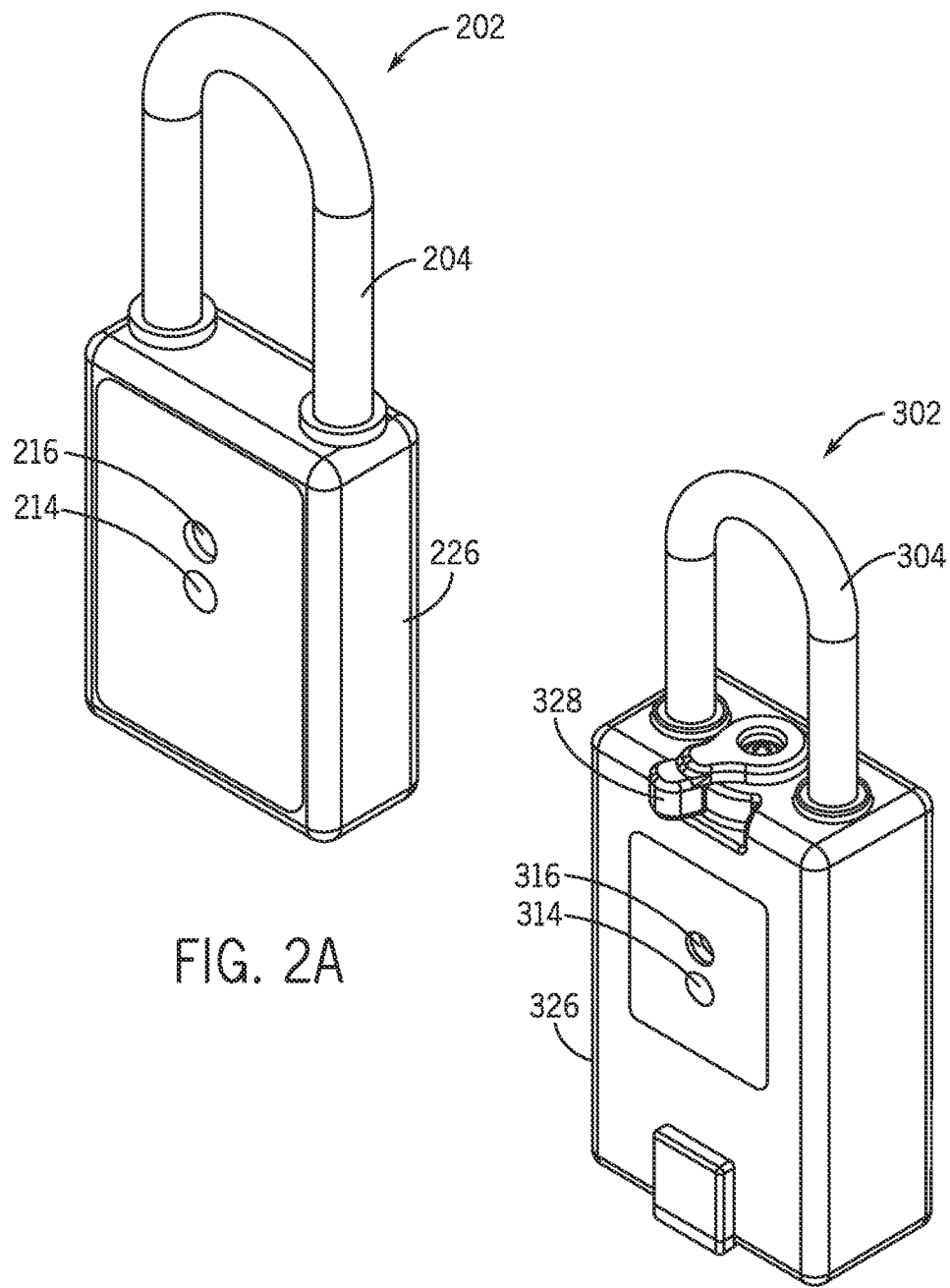
FIG. 2A is a perspective view of one embodiment of a lockout/tagout device in which the device is directly activated.
FIG. 2B is a perspective view of another embodiment of a lockout/tagout device in which the device is activated by a thumb lever.

Now with additional references to FIGS. 2A and 2B, two examples of lockout/tagout devices are illustrated.

In FIG. 2A, a lockout/tagout device 202 is illustrated in the form of a padlock having a lockable body 226 having the locking member 204 such as a U-shaped shackle. In the form illustrated, the lockable body 226 further supports the activation indicator 216 in the form of a light emitting diode (LED) and a user-activated control 214 in the form of a button. The other components (i.e., the non-volatile memory, the controller, and the wireless link) are all contained within the lockable body 226 and are not visible.

This lockout/tagout device 202 is a direct activation device. In order to unlock this lockout/tagout device 202, the user-activated control 214 is pressed to wake up the lockout/tagout device 202 which turns on the LED of the activation indicator 216 to display a first color (for example, red, although other colors could also be employed) and turns on the wireless link. At this point, an authorized user can swipe a wireless identification device in the form of an RFID card near the lockable body 226 in order for the wireless link to read the wireless identification device. If the wireless identification device is approved, then the LED of the activation indicator 216 will turn a second color (for example, green, although other colors could also be employed) that is different from the first color and an internal motor will rotate an internal mechanism of the locking member 204 to unlocked state. The locking member 204 is then able to be retracted from the body. The lock will de-energize and hold the locking member 204 in the unlocked state. In order to lock the lockout/tagout device 202, the user-activated control 214 is again pressed and the wireless identification device is swiped against the lockable body 226 to be read by the wireless link contained therein. The LED of the activation indicator 216 may turn the second color (for example, green) to indicate that the wireless identification device has been accepted. Once the locking member 204 has been reinserted, then the motor will rotate the internal mechanism to the locked position. The lock will then de-energize and hold the locking member 204 in the locked state or position. Alternately, the locking member 204 can be reinserted prior to the wireless identification device being swiped. For example, the user-activated control 214 may again be pressed and the wireless identification device is swiped against the lockable body 226 to be read by the wireless link contained therein. The LED of the activation indicator 216 may turn the second color (for example, green) to indicate that the wireless identification device has been accepted and due to the presence of the locking member 204 the motor will rotate the internal mechanism to the locked state or position.

During these steps, the controller inside the lockout/tagout device 202 will write the relevant usage information to the non-volatile memory which usage information, as stated earlier, cannot be erased or re-written either by virtue of the programming of the controller or by the physical qualities of the non-volatile memory. As one example, when the lockout/tagout device 202 is unlocked, the controller may instruct usage information to be written to the non-volatile memory including information about the wireless identification device used to operate the lockout/tagout device 202, the state or change of state of the locking member 204, the time of operation, and/or the location of the lockout/tagout device 202 during operation. Similar information may be written during a locking operation (albeit, identifying that the lock was being locked and not opened as in the previous example).

FIG. 2B illustrates a similar lock to that illustrated in FIG. 2A, but in which, instead of motorized movement of the locking member 304 relative to the lockable body 326 in the lockout/tagout device 302, a thumb lever 328 is manually actuated by the user to unlock the locking member 304, such that the locking member 304 can be manually pulled out. As with the embodiment illustrated in FIG. 2A, to unlock the lockout/tagout device 302 of FIG. 2B, the user-activated control 314 is pressed to wake up the lockout/tagout device 302 (that is, to turn the activation indicator 316, for example, red indicating that the device 302 is enabled for reading of the wireless identification device and to activate the wireless link). Then, after the wireless identification device has been swiped by the lockable body 326 to be read by the wireless link, the activation indicator 316 will turn, for example, green to indicate the credentials have been accepted if the credentials are valid and authorized. At this point, an internal motor activates an internal mechanism such that the user may manually move the thumb lever to the left to unlock and pull the locking member 304 out. The lock will de-energize and hold in unlocked position. In order to lock this type of lockout/tagout device 304, the user again presses the user-activated control 314 and swipes the wireless identification device (for example, RFID card) against the lockable body 326. If the wireless identification device is accepted, then the locking member 304 is inserted and the user moves the lever to the right to lock. The lock will de-energize and hold in the locked position. Again, usage information is written to the non-volatile memory as these various step occur to provide a secure access record for the specific lockout/tagout device. Again, this usage information is protected by either permissions presented by the controller or other hardware or the physical type of the memory itself.

Figure 3A:
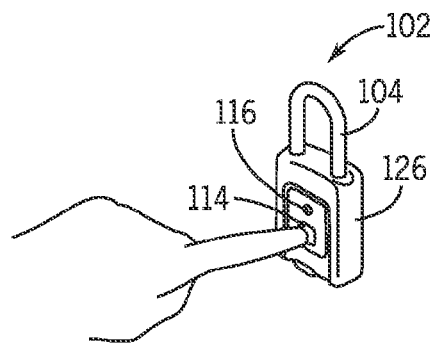
FIGS. 3A through 3C shows a series of steps for the use of the lockout/tagout device in a lockout/tagout procedure.
Figure 3B:
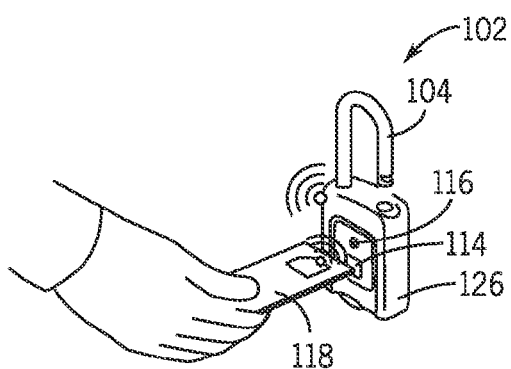
Figure 3C:
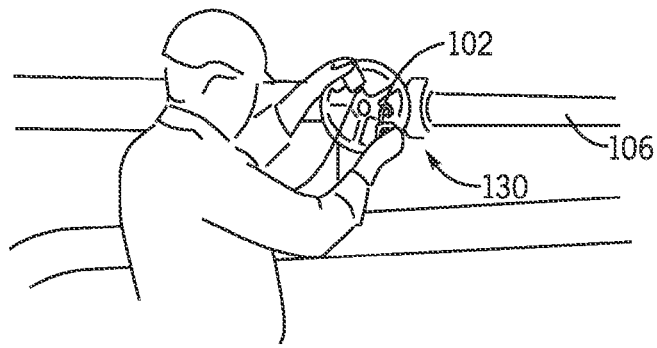
Figure 4:
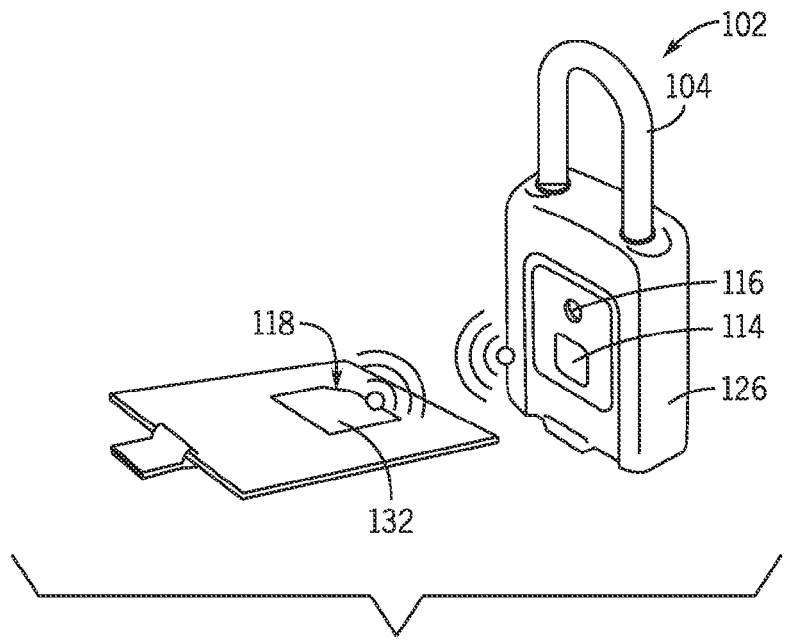
FIG. 4 shows a detailed view of the wireless identification device and the lockout/tagout device in close proximity to one another.

Turning now to FIGS. 3A through 3C and 4 and reverting to the generic 100-series reference numerals for the duration of the detailed description, schematics are provided illustrating how a lockout/tagout device 102 of this type may be affixed to an energy isolation point 130 on equipment 106 as part of a lockout procedure. As illustrated in the first step of FIG. 3A, the user-activated control 114 on the lockout/tagout device 102 is pressed to activate the wireless link 112 and illuminate the activation indicator 116. At this point, the user can swipe credentials in the form of a wireless identification device 118 near the body 126 of the lockout/tagout device 102 as illustrated in FIG. 3B and, if the lockout/tagout device 102 is programmed to accept the credentials, then this causes the locking member 104 to open or become unlocked. As illustrated in the detail of FIG. 4, a unique chip 132 such as an RFID chip can be carried on the wireless identification device 118 to communicate with the wireless link 112 in the lockout/tagout device 102 and potentially serve as a key to unlock the locking member 104. Notably, when the wireless identification device 118 is used to open the lockout/tagout device 102, then the controller 108 is programmed to write usage information including information about the unique wireless identification device to the non-volatile memory 110. Returning to FIG. 3C, the opened lockout/tagout device 102 can then be applied to energy isolation point 130 on the equipment 106 in order to lock out the energy isolation point 130. In the particular form illustrated in FIG. 3C, the control at the energy isolation point 130 is a valve and the lockout/tagout device 102 is placed through the valve once the valve has been turned to the off position in order to secure and lockout the valve.

Figure 5:
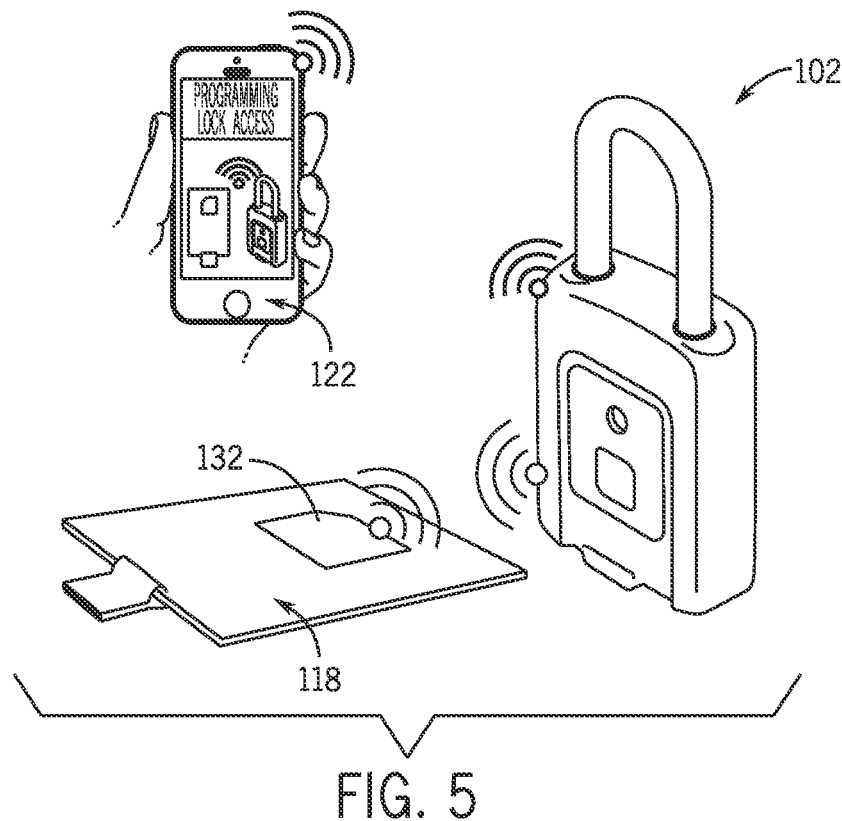
FIG. 5 shows an arrangement in which a mobile/wireless device is used in conjunction with the lockout/tagout device and the wireless identification device in order either program the lockout/tagout device or to collect usage data from the lockout device.

It is contemplated that the lockout/tagout device 102 may be a standalone lock, may be a networked lock, or may be a SCADA-integrated lock. If the lockout/tagout device 102 is a standalone lock or a networked lock, then the lockout/tagout device 102 may potentially be programmed via a master tag (that is, swiping a master tag that indicates whether to accept or decline the subsequently swiped unique wireless identification device), via a wireless protocol (such as NFC as illustrated in FIG. 5), or via a USB connection or other wired connection (although programming via USB connection or other wired connection would require the addition of an input port on the lockout/tagout device 102 to accept the wired connection). Event data from the secure access history may be read via a wireless connection (NFC, Bluetooth® or another wireless protocol) or a wired connection (for example, USB or other wired connection). If the lockout/tagout device 102 is designed to be networked (via, for example, the 802.11 protocol or WIFI), then each of the lockout/tagout devices 102 may have a known energy isolation location in a facility and the statuses of each of the locks may be remotely monitored. Similarly, for SCADA-integrated locks such as those illustrated in FIG. 6, the lockout/tagout device 102 may interface with a supervisory control system and the information from the lockout/tagout device 110 may travel through a control network to the SCADA network or directly.

With specific reference to FIG. 5, the lockout/tagout device 102 is shown in wireless communication via wireless link 112 with two different items over two different wireless protocols. As previously described, the wireless link 112 can include an RF transponder used to read an RFID tag 132 on the wireless identification device 118. However, as illustrated in FIG. 5, the wireless link 118 can also include another protocol such as NFC that permits the wireless link 112 to communicate with a wireless/mobile device 122. It is contemplated that the wireless/mobile device 122 can be used to program the lockout/tagout device 102 to accept or to not accept unique wireless identification devices 118. Further, in some instances, the wireless/mobile device 122 can access or collect data from the secure access record of the lockout/tagout device 102 in order to read the data and determine which wireless identification devices 118 were used to access and operate the lockout/tagout device 102 as well as other usage information.

Figure 6:
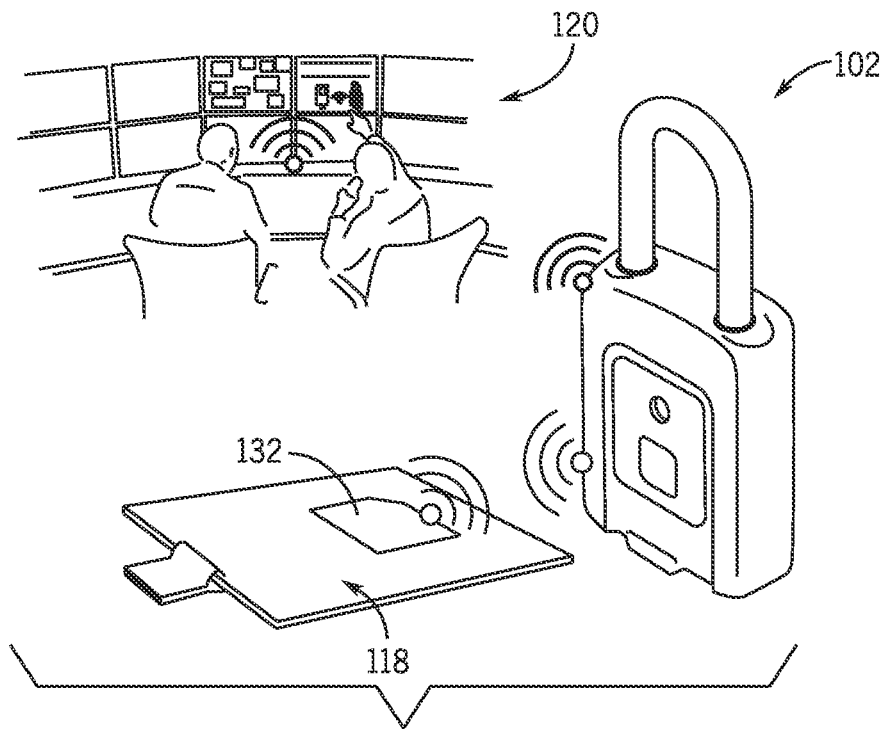
FIG. 6 is an arrangement similar to that shown in FIG. 5, but in which a supervisory control and data acquisition (SCADA) device is used instead of the mobile/wireless device of FIG. 5.

With reference to FIG. 6, another variant is shown in which the lockout/tagout device 102 may be integrated with a SCADA system 120 via the wireless link 112 as well as be capable of reading a wireless identification device 118 using a localized wireless protocol (for example, WIFI or Bluetooth).

Figure 7:
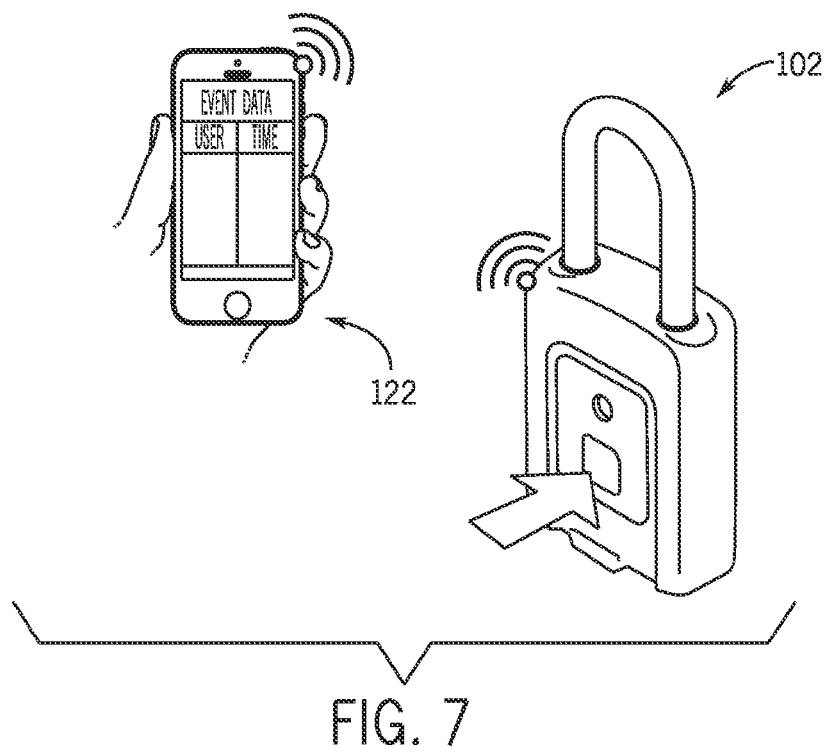
FIG. 7 illustrates one way to access the usage information from the lockout/tagout device using a mobile device.

Turning now to FIG. 7, one example method of accessing event data from the secure access record of the non-volatile memory 110 is illustrated using a wireless/mobile device 122. As illustrated, the user-activated control 114 may be operated to wake the wireless link 112 of the lockout/tagout device 102. Once the wireless link 112 of the lockout/tagout device 102 is activated, then the wireless/mobile device 122 may establish a data link with the lockout/tagout device 102 in order to provide read-only access to the secure access record including the usage information. It is contemplated that the act of connecting the wireless/mobile device 122 to the lockout/tagout device 102 may also cause the controller 108 to write an event to the secure access record entering that the record was read from and include information about the wireless/mobile device 122 performing the reading of the lockout/tagout device 102.

Figure 8:
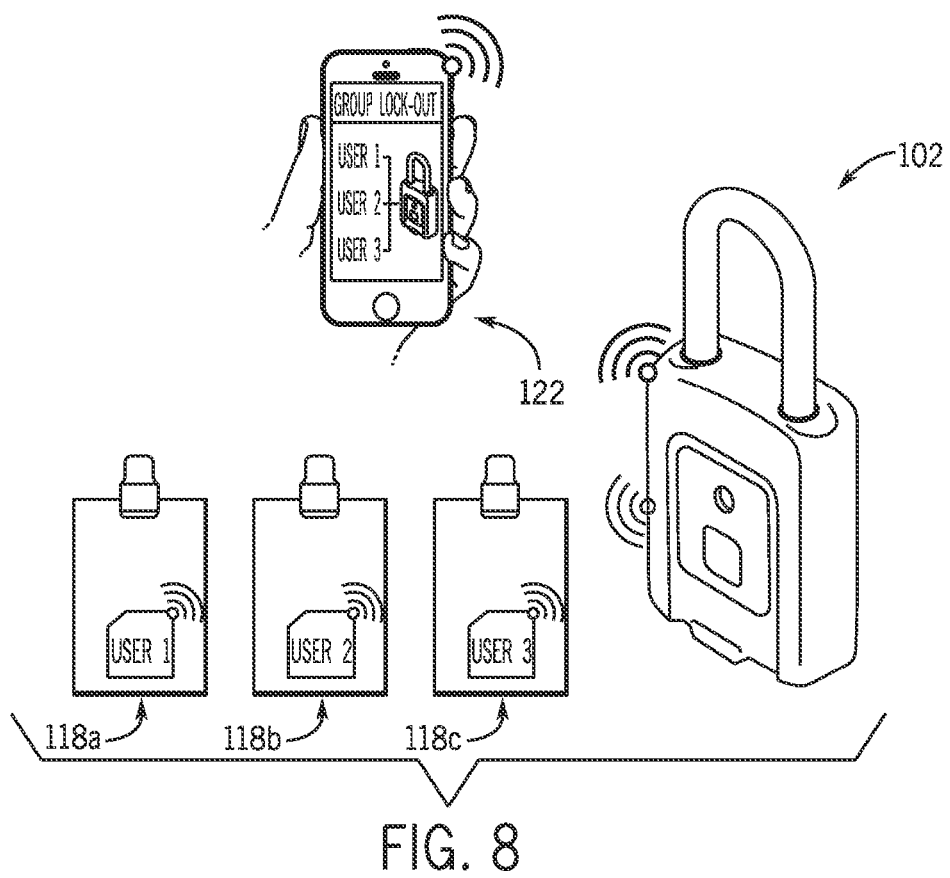
FIG. 8 illustrates one way the lockout/tagout device may be used in a group lockout procedure.

Looking now at FIG. 8, an arrangement is illustrated in which the lockout/tagout device 102 is configured for group lockout. In this arrangement, the lockout/tagout device 102 is programmed (using a wireless mobile device 122, SCADA system or other wired or wireless connection) to require multiple unique wireless identification devices 118*a*, 118*b*, and 118*c* in order to use the lockout/tagout device 102. As one example, multiple users and their respective wireless identification devices 118*a*, 118*b*, and 118*c* may be required to be in the proximity of the lockout/tagout device 102 or swiped within a pre-determined amount of time order to permit use of the lockout/tagout device 102 (for example, permit the locking member 104 to be placed in an opened state).

Figure 9:
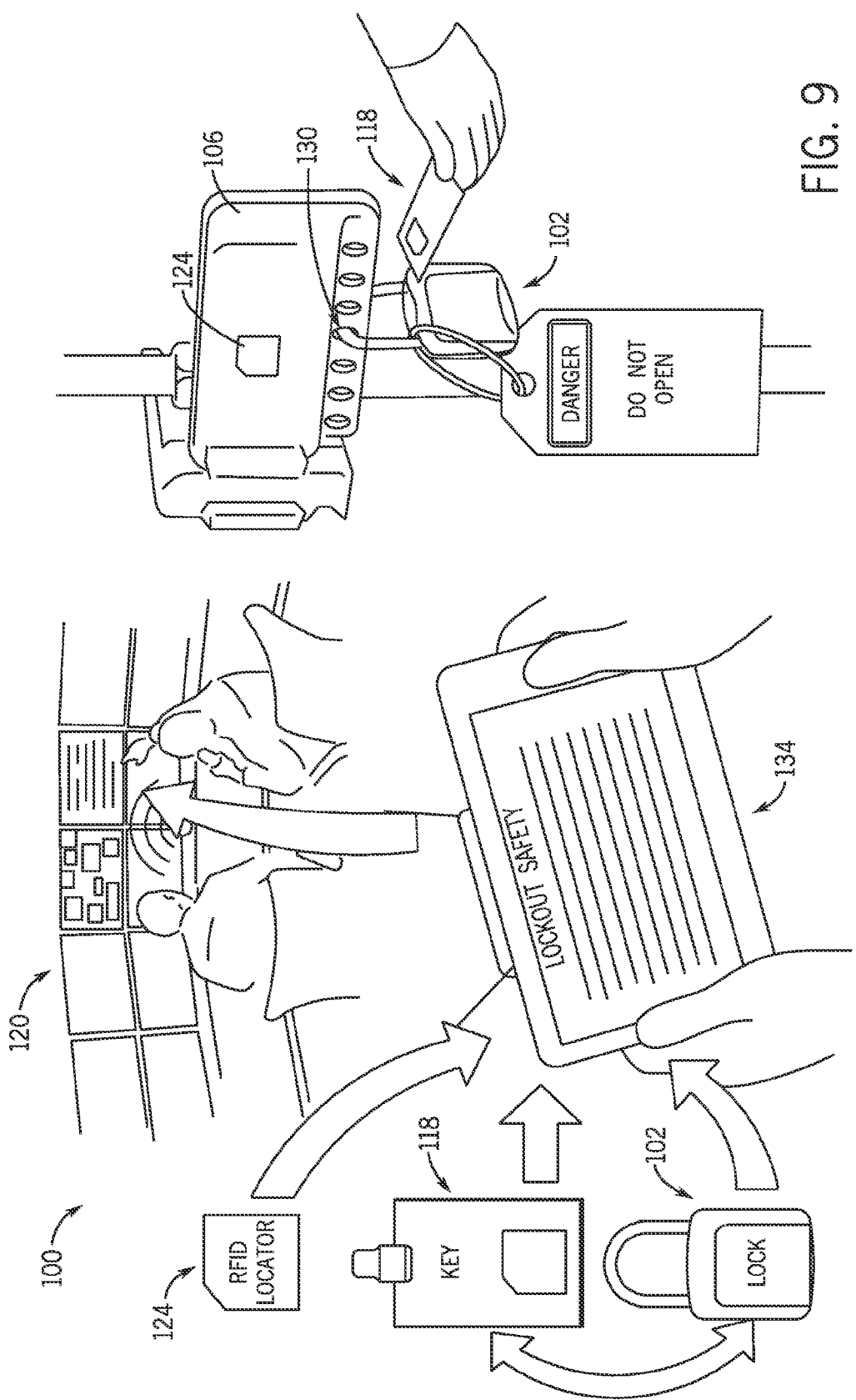
FIG. 9 illustrates an arrangement in which the lockout/tagout device is used in conjunction with a locator tag in order to provide location information about the application of the lockout/tagout device to a particular energy isolation point and how a smart device may serve as a data bridge between the components the energy isolation point and a central console as well as provide information about lockout/tagout items and procedures.

Turning now to FIG. 9, it is also contemplated that the lockout/tagout system 100 may be made to include a locator tag 124 such as an RFID locator tag. This locator tag 124 may be fixed proximate to the energy isolation point 130 of the equipment 106 and may be read by the lockout/tagout device 102 during an access event and information related to this locator tag written to the secure access record with the usage information. In this way, the lockout/tagout device 102 can provide a record not only of when and who accessed the lockout/tagout device 102, but also to which unique equipment the lockout/tagout device 102 was attached. This can be used to avoid a situation in which one lockout/tagout device is replaced with another lockout/tagout device in order to obscure the actual history of a particular energy isolation point.

FIG. 9 further illustrates that a smart device 134, which might be a tablet or other portable device, may be used in proximity to any one of a number of the various tags, indicators and devices to provide the usage history of these items, program the device, or communicate with a central network or SCADA in order to update information thereto regarding the devices, tags and keys. Essentially, this smart device can act as a remote console, particularly in environments in which it may be difficult to wirelessly or directly connect a central monitoring system to the various devices, tags, wireless information devices (for example, keycards) and so forth throughout a facility. Further the smart device 134 may effectively act as a data bridge permitting the near field communication with the tags and lockout/tagout device (s) to be communicated to a centralize system such as a SCADA 120 or wireless network over for example a WIFI connection of the smart device 134.

In most instances, the lockout/tagout device 102 will be a separate device that is selectively attachable to an energy isolation point in order to lock it out and that, accordingly as a separate device, it may be desirable for the lockout/tagout device 102 to use minimal power as an internal battery will provide power.

In some embodiments, the presence of the internal battery can be used to allow the user to use a passive tag as the wireless communication device. To conserve energy, the wireless link 112 will ideally go into sleep mode relatively quickly if not wireless communication device 118 is detected. The internal battery may be easily replaced in case of failure and the lockout/tagout device 102 may provide some battery life status information during activation after the user-activated control 114 is operated. For example, if power is low after the user-activated control 114 is operated, then the activation indicator 116 may blink intermittently to indicate this. It is contemplated that a ⅓N battery (160 mAh) may be used in a direct activation design illustrated in FIG. 2A and a CR2 (750 mAh) battery may be used in the lever activation design illustrated in FIG. 2B. It is contemplated that the battery may be a rechargeable battery, such as, for example, a lithium ion battery.

In terms of power consumption based on the type of wireless link or communications link, NFC (which is a form of RFID and would use the same or similar communication chip) has fast automatic set-up (less than 0.1 s, no pairing), has low power consumption, is already present in many mobile devices, and has a 0.2 m range. In contrast, Bluetooth® communication demands more power, has a longer set-up (6 s) than NFC, requires pairing, and has a greater potential range (up to 100 m). Although is available on most mobile devices, Bluetooth® may have trouble if multiple devices are near during pairing. Alternatively, a physical connection to program the lock would likely involve including a port on the lockout/tagout device such as a mini USB port. If using USB, power potentially could be sent from the host (PC, laptop, tablet) to the battery in the lockout/tagout device during programming to recharge the battery in the lockout/tagout device 102.

Turning now to FIGS. 10A through 10K, various operational steps are illustrated that show the programming of the lockout/tagout device and its subsequent use in a lockout/tagout procedure.

Figure 10A:
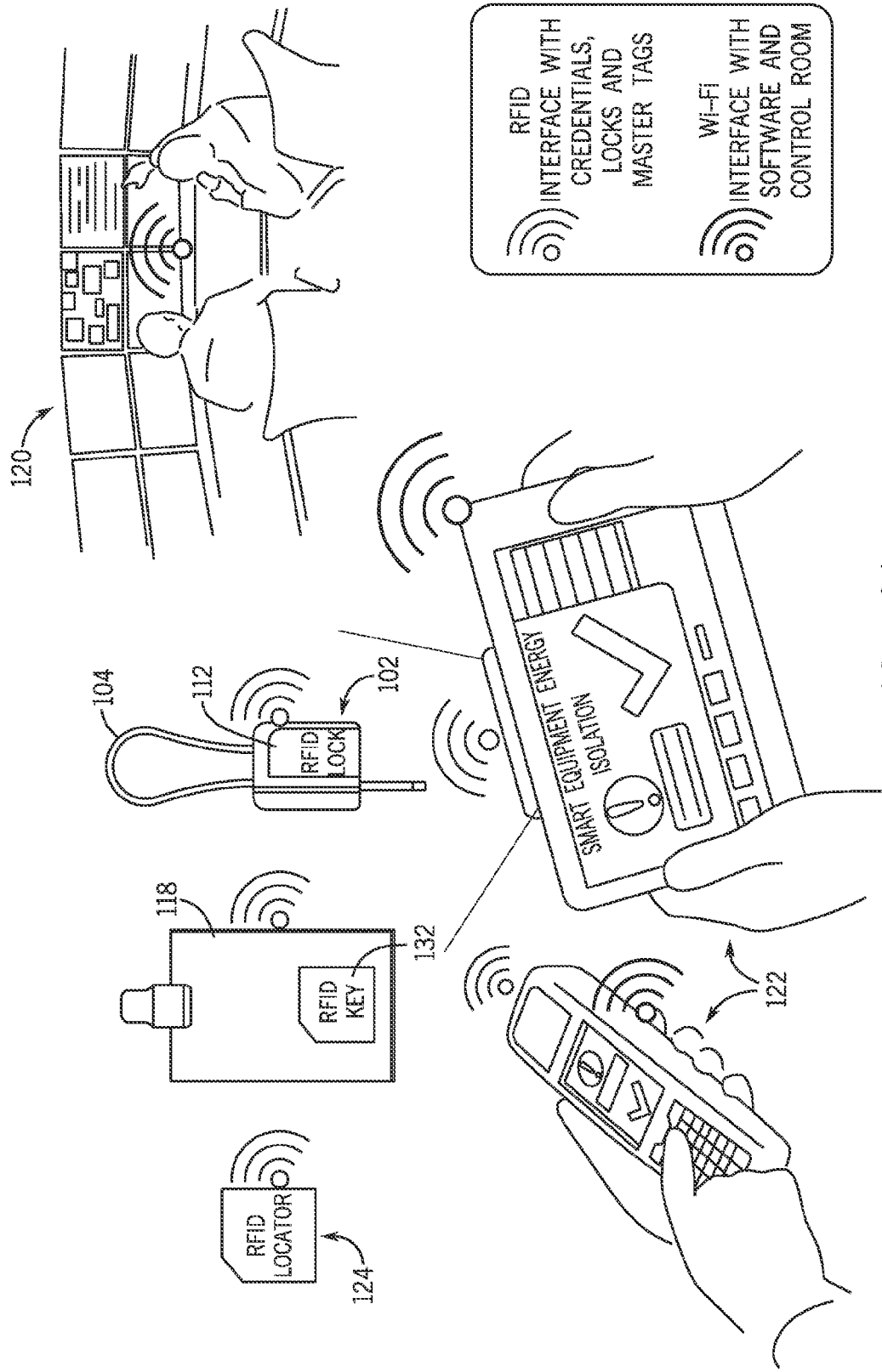

Looking first at FIG. 10A, the various components of a sample system are illustrated including a master tag ID providing an RFID locator 124, credentials 118 including an RFID tag, and a smart lock 102 with an RF transponder 112. It is noted that in FIG. 10A, the smart lock 102 is illustrated as being a cable lock having an internal mechanism that selectively constricts around the cable to lock a segment of the cable relative to the body of the lock. However, it is contemplated that this smart lock 102 could also be of the body and shackle type illustrated previously herein. Isolation management software can be installed on a computer 120 that provides a facility map, equipment information and lockout procedures. Smart devices 122 such as a portable handheld unit or a tablet can have hardware that used to read RF transponder 112 on the lockout device(s) 102, potentially program them, and provide relevant equipment and procedure information to the end user performing the lockout/tagout procedure. In the illustrated embodiment, an RFID interface is used so that the RFID locator tag 124, credentials 118, smart lock 102 and smart devices 122 can communicate with one another. A WIFI interface is used to interface the smart device(s) 122 with the software and the control room or centralized console 120. The smart devices 122 bridge the information provided by the RFID devices to the central control room and related software via WIFI.

Turning to FIG. 10B, the facility can be mapped such that all of the energy isolation points are defined. Then, the smart devices 122 can be used to identify the user location within the facility and provide information to the user about lockout/tagout procedures based on location or read tags throughout the facility. Meanwhile the smart device 122 can remain in communication with the control room, such that the control room can monitor the actions and location of the user using the smart device.

Now with reference to FIG. 10C through 10F, an exemplary lockout procedure is illustrated.

Figure 10C:
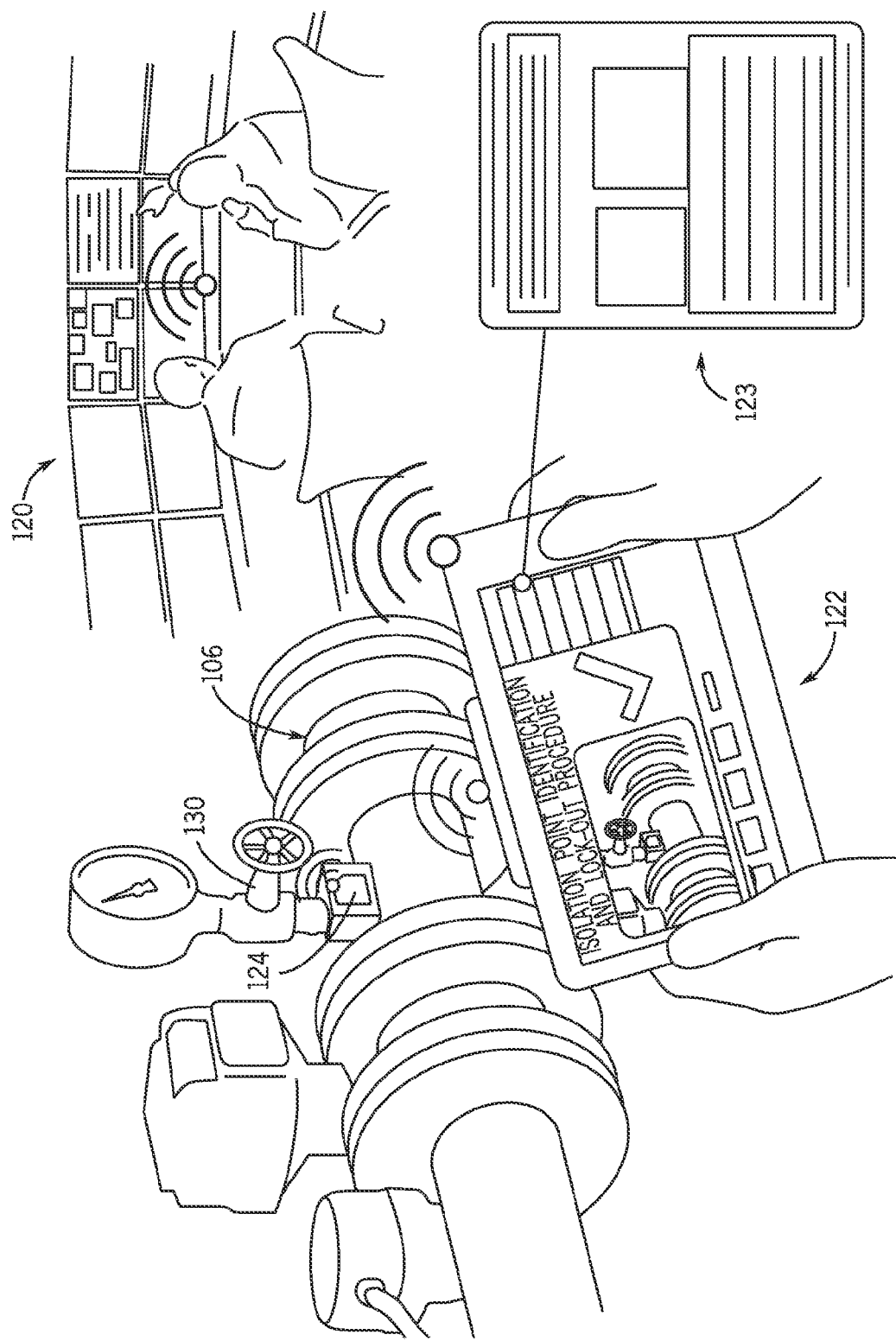

First, as illustrated in FIG. 10C, the smart device 122 scans and reads the locator tag 124 near an isolation point 130 on the equipment 106. The smart device 122 may then provide an identification of the specific energy isolation point and provide information to the user about the lockout/tagout procedure to be followed. During this time, the smart device 122 may be in communication with the control room 120 to inform the control room 120 that a particular isolation point has been read and may provide information 123 about the lockout procedure to users in the control room 120 as well.

Figure 10D:
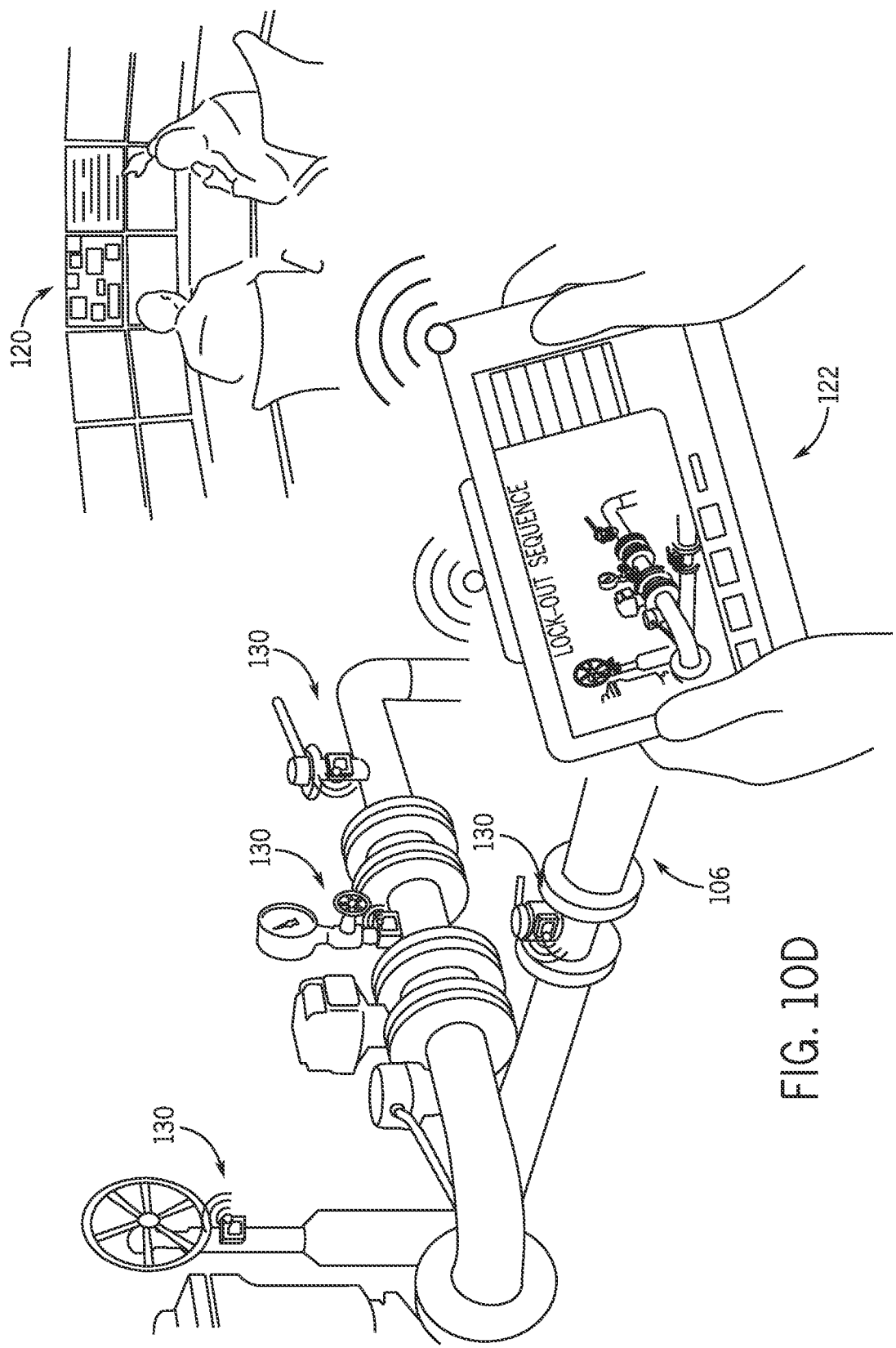

As illustrated in FIG. 10D, the smart device 122 may then inform the user of all of the appropriate energy isolation points 130 on the particular piece of equipment 106 and the order in which the various controls should be shut off (if appropriate). In the illustrated embodiment, there are four separate isolation points to be locked out.

The lockout procedure for a specific isolation point is then illustrated in FIG. 10E. In FIG. 10E, it can be seen that the smart device 122 reads the locator tag 124 (as shown on the left side of the figure) and provides information about the specific lockout procedure to be followed. The user turns off the control at the isolation point 130 (as shown on the right side of the figure) and scans their valid credentials 118 to open the lockout/tagout device 102 and applies the lockout/tagout device 102 to the isolation point 130. Again, during or after the application of the lockout/tagout device 102 this isolation point 130, the smart device 122 may confirm the lockout and transmit this information to the control room 120. Further, as outlined about, usage information can be written to the non-volatile memory 110 in the lockout/tagout device 102 during the application of the device 102. This lockout/tagout procedure is followed at each of the required isolation points 130 on the equipment 106.

After the various lockout/tagout steps have been performed then, the smart device 122 is used to confirm lockout has been fully performed as illustrated in FIG. 10F. At this point, if any lockout/tagout steps have not been performed, then the smart device 122 can be used to indicate the user of this fact and any additional isolation points 130 that may need to be locked out.

Once the lockout procedure is confirmed as complete, then a technician can safely repair the equipment 106 as illustrated in FIG. 10G with the isolation points 130 being secure.

Figure 10H:
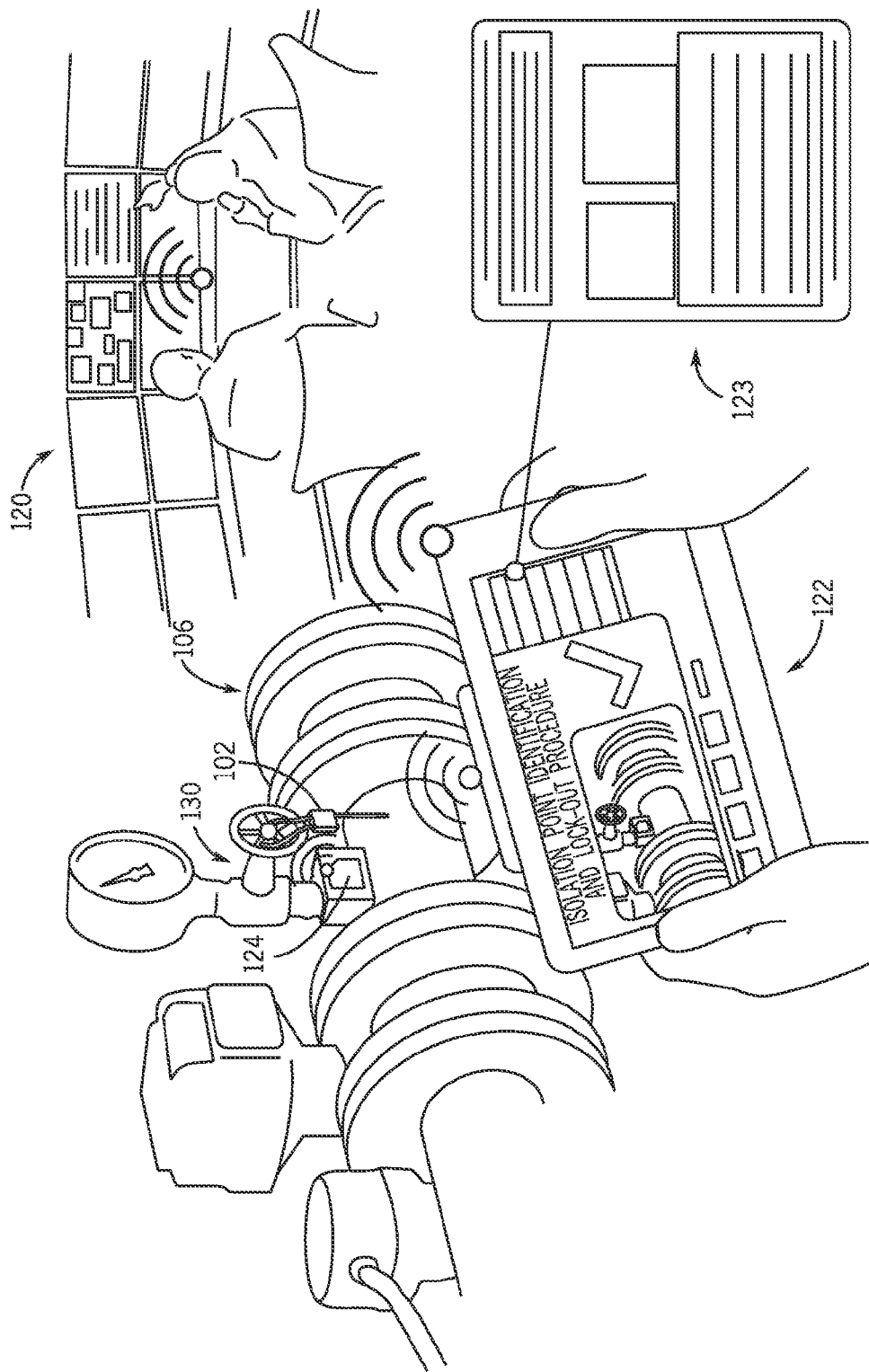
Figure 10I:
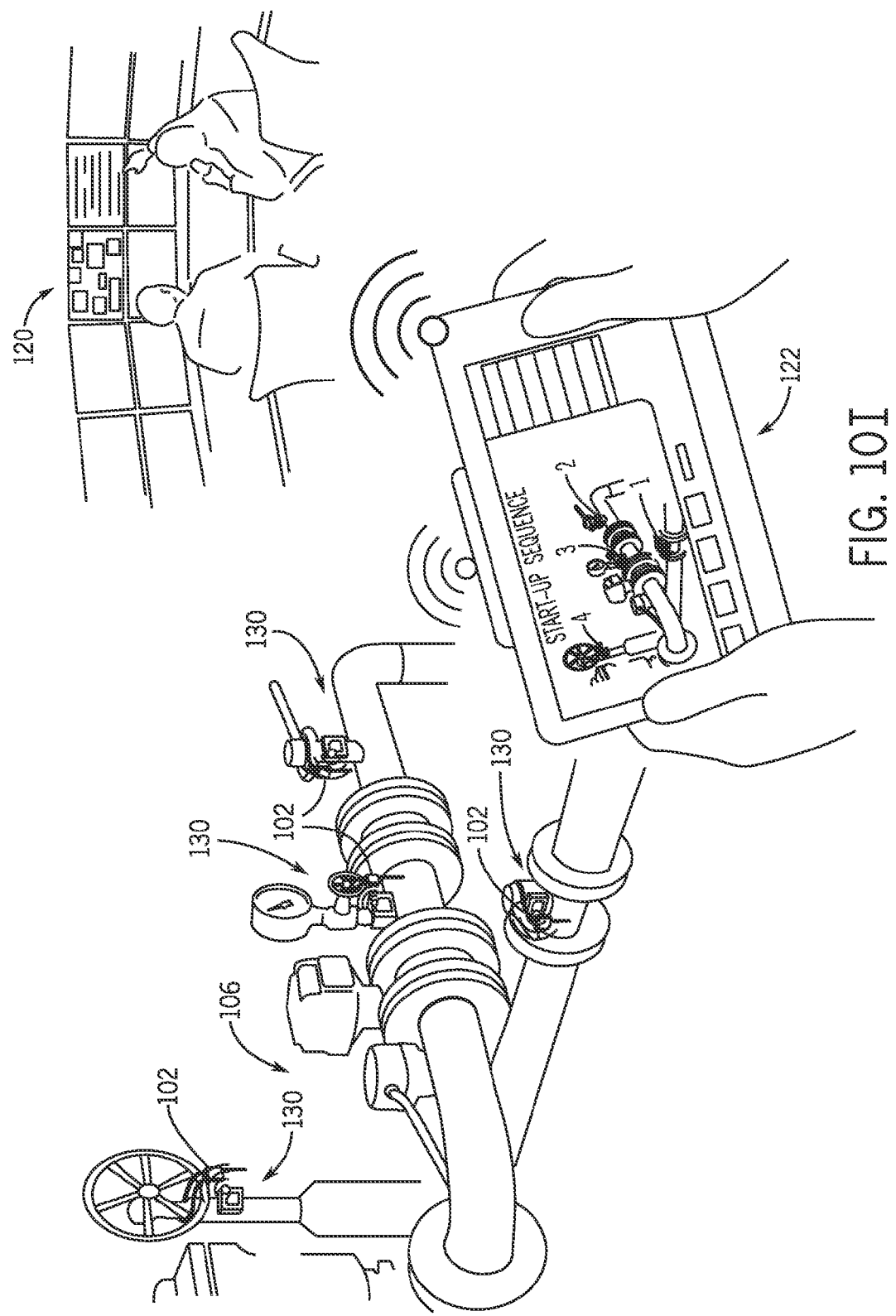

After the repair or maintenance work is completed, then the equipment can be started back up following the sequence of steps illustrated in FIGS. 10H to 10K. In FIG. 10H, the smart device 122 can again be used to provide the user with information 123 about start up procedures. As further illustrated in FIG. 10I, the smart device 122 and the control 120 may be provided with specific start up sequencing steps for re-activating the various isolation points 130 on the equipment 106.

Figure 10J:
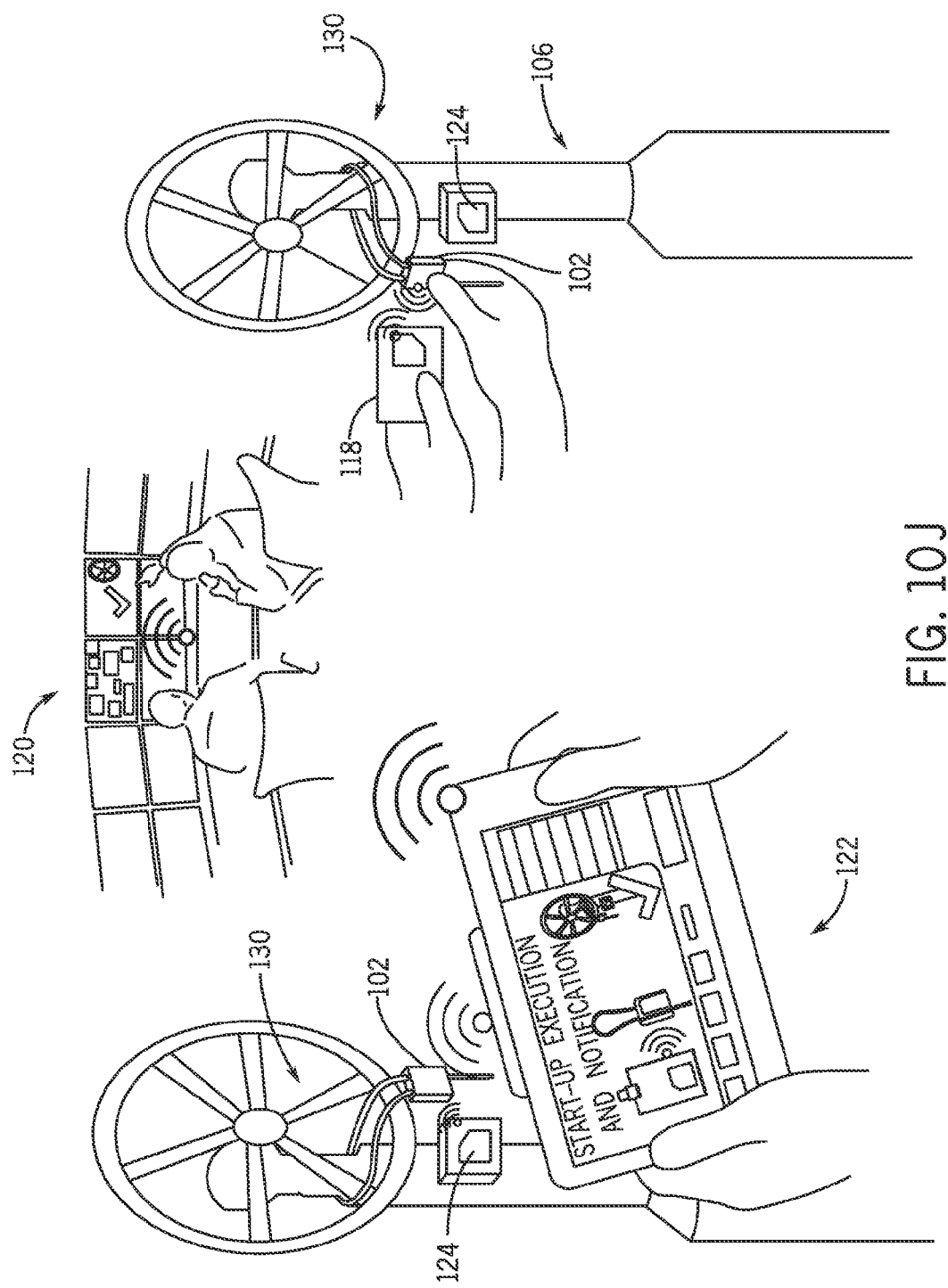

With this sequencing information available, the technician can go to each of the isolation points 130 in proper sequence and scan the locator tag 124 as illustrated in FIG. 10J. Upon confirmation that the particular isolation point is appropriate to re-activate or re-energize, the user can scan his or her credentials 118 to permit opening of the lockout/tagout device 102 and remove it from the control. At this point, the control can be reactivated. During this removal operation, the non-volatile memory 110 on the lockout/tagout device 102 can record the usage information as described elsewhere in this application and the smart device 122 can process and relay the actions to the control room 120, as well as provide information about the next appropriate steps to take to start up the equipment 106 again.

Finally, as shown in FIG. 10K, after all of the isolation points 130 on the equipment 106 have been unlocked, the smart device 122 and the control room 120 can be notified that the start-up is complete. If appropriate, upon confirmation that all lockouts have been removed, a separate powering on step for the equipment 106 may be performed.

It is also contemplated that the lockout/tagout device 102 may interconnect to or in communication with other lockout/tagout devices in order to share usage information or operational data with one another. In one example, multiple lockout/tagout devices are needed to de-energize a piece of equipment. Once locked, the lockout/tagout devices may not be opened except in a specific order and after each individual lockout/startup occurs one of the devices directly communicates this to another one or multiple of the devices.

Finally, it should be appreciated that the lockout/tagout devices described herein may also be more generally referred to as a smart isolation device. Such smart isolation devices need not be used in lockout/tagout procedures, but may be used in other contexts as well. It will be further appreciated that while such devices have been illustrated as separate locking mechanisms attached to energy isolation points, that it is contemplated that the smart isolation device might be permanently integrated into the energy isolation point itself or into another control. For example, the smart isolation device including the non-volatile memory, wireless link, and so forth, may be built directly into the structure of a lockable valve or other control. Apart from being integrally formed in the control or energy isolation point and adapted to its specific structure, this smart isolation device may work just as the lockout/tagout device described herein.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A smart isolation device comprising:
   a lockable body;
   a locking member attached to the lockable body and selectively forming an opened loop or a closed loop with the lockable body;
   a wireless link for selective communication with a wireless identification device carried by a user;
   a non-volatile memory for storing usage information about the smart isolation device; and
   a controller in communication with the wireless link and the non-volatile memory, the controller programmed to receive a signal from the wireless link and write the usage information about the smart isolation device to at least a portion of the non-volatile memory such that the portion of the non-volatile memory storing the usage information cannot be erased or re-written in which the usage information written to the non-volatile memory includes unique identifying information about the wireless identification device used to operate the smart isolation device in conjunction with a state or change of state of the locking member and further includes information about the time of usage of the smart isolation device and an energy isolation point associated with the smart isolation device that are written in conjunction with the unique identifying information about the wireless identification device and the state or change of state of the locking member.

2. The smart isolation device of claim 1, wherein the non-volatile memory is a field programmable read only memory (FPROM), a one-time programmable memory (OTP), or a programmable read only memory (PROM) physically preventing an erasure or re-writing of the portion of the non-volatile memory storing the usage information.

3. The smart isolation device of claim 1, wherein the controller is programmed to prevent the portion of the non-volatile memory storing the usage information from being erased and re-written, even if the non-volatile memory is physically capable of being erased or re-written.

4. The smart isolation device of claim 1, wherein the wireless link, the non-volatile memory, and the controller are supported by the lockable body of the smart isolation device.

5. The smart isolation device of claim 1, further comprising a user-operated control supported by the lockable body and in communication with the controller, the controller further programmed such that, upon operation of the user-operated control, the controller temporarily activates the wireless link for communication with the wireless identification device.

6. The smart isolation device of claim 5, wherein the controller is further programmed to deactivate the wireless link a pre-determined amount of time after the operation of the user-operated control such that the wireless link is deactivated and not communicable with the wireless identification device.

7. The smart isolation device of claim 1, wherein the wireless identification device is one of a plurality of unique wireless identification devices in which each of the plurality of unique wireless identification devices are communicable with the wireless link.

8. The smart isolation device of claim 1, wherein the wireless link includes a radio frequency (RF) transponder in the smart isolation device for reading a radio frequency identification (RFID) tag in the wireless identification device.

9. The smart isolation device of claim 1, wherein the usage information written to the non-volatile memory provides a tamper-proof history of the smart isolation device.

10. The smart isolation device of claim 1, wherein the controller is further configured to alter the smart isolation device between a locked state and an unlocked state upon a detection of the wireless identification device by the wireless link.

11. The smart isolation device of claim 1, wherein the wireless link for selective communication with a wireless identification device operates using a communication protocol selected from the group consisting of near field communication (NFC), WIFI implementing 802.11 standards (WIFI), Bluetooth, Bluetooth Low Energy (Bluetooth LE), and radio frequency identification (RFID).

12. A smart isolation system comprising:
    the smart isolation device of claim 1; and
    a wireless identification device for selective communication with the wireless link of the smart isolation device.

13. The smart isolation system of claim 12, wherein the wireless link includes radio frequency (RF) transponder in the smart isolation device and a radio frequency identification (RFID) tag in the wireless identification device.

14. The smart isolation system of claim 12, wherein the wireless identification device is embedded in a separate maintenance tool or smart device for use with an item of equipment on which the smart isolation device is placed.

15. The smart isolation system of claim 12, further comprising a locator tag securely and non-movably received on equipment for smart isolation at the energy isolation point on the equipment and wherein the controller of the smart isolation device is programmed to read the locator tag upon use of the smart isolation device to write location information into the usage information.

16. The smart isolation system of claim 12, further comprising a central network for communication with other network elements and a display on other network elements.

17. The smart isolation device of claim 1, wherein the state or change of state of the smart isolation device includes information about whether the locking member is opened or closed.

18. The smart isolation device of claim 1, wherein the locking member is a shackle.

19. The smart isolation device of claim 1, wherein the energy isolation point is located on a piece of equipment.

20. The smart isolation device of claim 19, wherein the piece of equipment comprises a plurality of energy isolation points.

21. The smart isolation device of claim 1, wherein the energy isolation point comprises at least one of a switch and a valve.

* * * * *